United States Patent
Yoshida

(10) Patent No.: US 8,922,627 B2
(45) Date of Patent: Dec. 30, 2014

(54) IMAGE PROCESSING DEVICE, IMAGE PROCESSING METHOD AND IMAGING DEVICE

(75) Inventor: Yuji Yoshida, Nagoya (JP)

(73) Assignee: Fujitsu Semiconductor Limited, Yokohama (JP)

( * ) Notice: Subject to any disclaimer, the term of this patent is extended or adjusted under 35 U.S.C. 154(b) by 382 days.

(21) Appl. No.: 13/568,631

(22) Filed: Aug. 7, 2012

(65) Prior Publication Data

US 2013/0038698 A1 Feb. 14, 2013

(30) Foreign Application Priority Data

Aug. 9, 2011 (JP) .................................. 2011-174151

(51) Int. Cl.
*H04N 13/02* (2006.01)
*G06T 7/20* (2006.01)
*G06K 9/62* (2006.01)
*H04N 13/00* (2006.01)
*G06T 7/00* (2006.01)

(52) U.S. Cl.
CPC ............ *G06T 7/2026* (2013.01); *G06K 9/6203* (2013.01); *H04N 13/0022* (2013.01); *H04N 13/0239* (2013.01); *G06T 7/0022* (2013.01); *G06T 2207/10021* (2013.01); *G06T 2207/20021* (2013.01)
USPC ............................................. 348/47; 348/42

(58) Field of Classification Search
USPC ..................... 348/47, 42, 48, 51, 262, 222.1; 359/462; 396/324, 325; 352/57, 60, 62; 382/154, 278

IPC ........... H04N 13/00,13/02, 13/04, 5/228, 5/225, H04N 9/09
See application file for complete search history.

(56) References Cited

U.S. PATENT DOCUMENTS

| 5,105,466 A * | 4/1992 | Tsujiuchi et al. ............. 382/162 |
| 6,552,742 B1 * | 4/2003 | Seta ................................. 348/42 |
| 2011/0279652 A1 * | 11/2011 | Eggert et al. .................... 348/47 |

FOREIGN PATENT DOCUMENTS

| JP | 2001-045523 | 2/2001 |
| JP | 2009-129420 | 6/2009 |

* cited by examiner

*Primary Examiner* — Sherrie Hsia
(74) *Attorney, Agent, or Firm* — Fujitsu Patent Center

(57) ABSTRACT

An image processing device includes an input unit that receives a first image and a second image that are taken from different positions. A first cutting unit cuts a first block from the first image. A second cutting unit moves a second block by P pixels in a row direction, in a moving limit set in a processing area of the second image, and cuts the second block from the second image. A correlation value calculating unit calculates a correlation value between the first and second blocks. A deviation amount calculating unit calculates an amount of deviation between the first and second images based on a largest value of the correlation value. The setting unit narrows the moving limit based on the correlation value calculated in the N-th row when the amount of deviation is calculated in the (N+1)-th row of the first image.

11 Claims, 24 Drawing Sheets

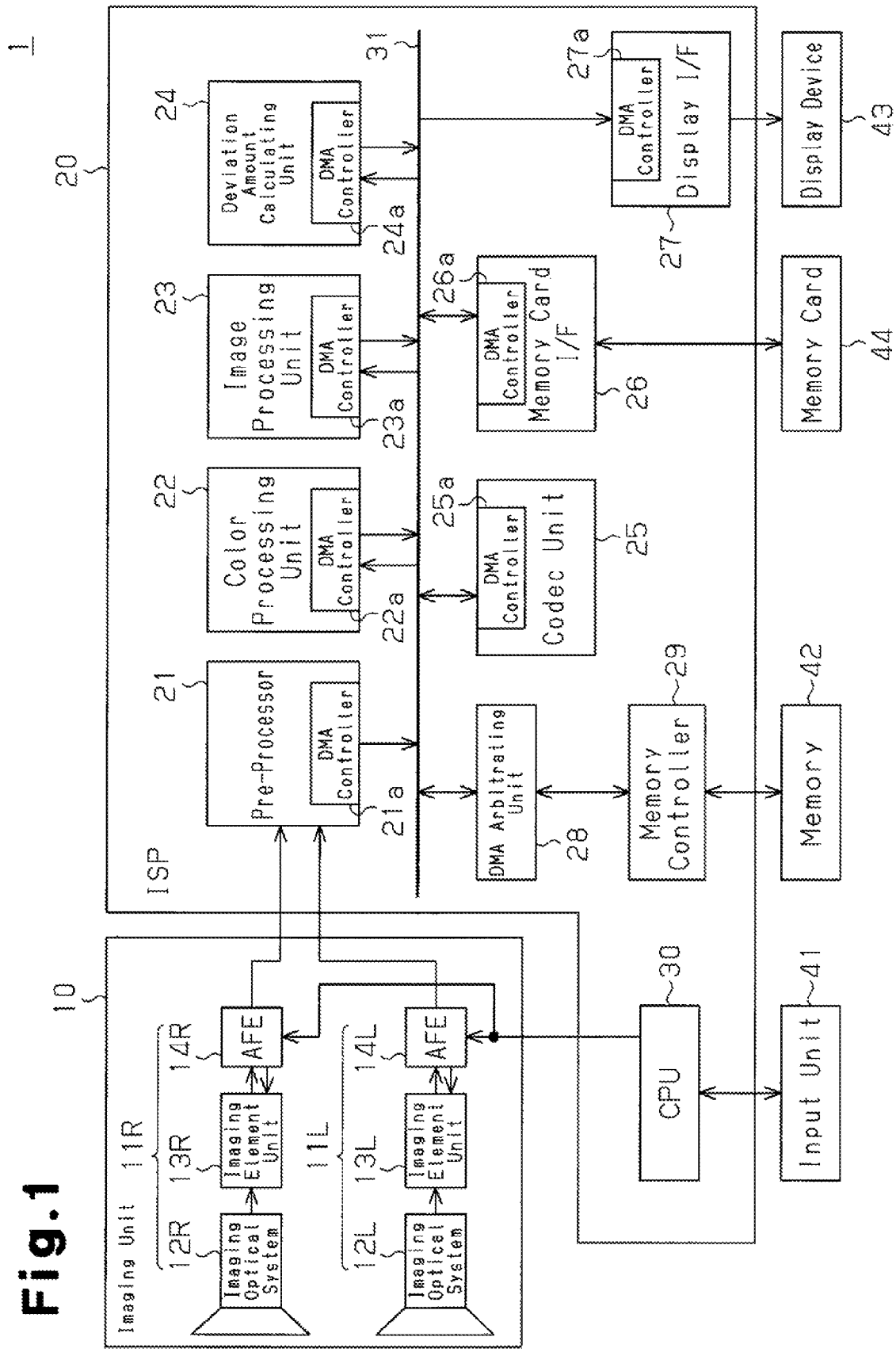

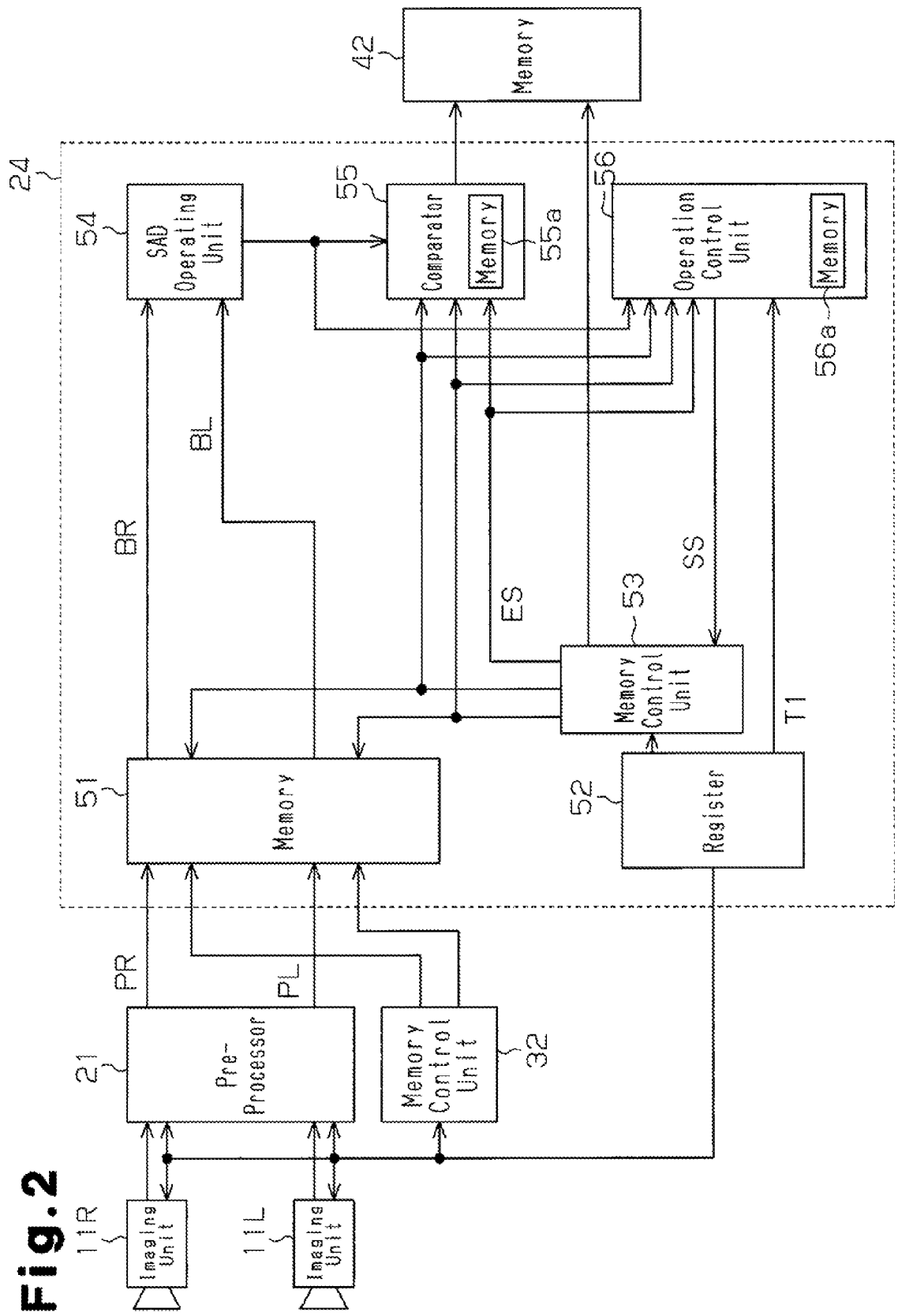

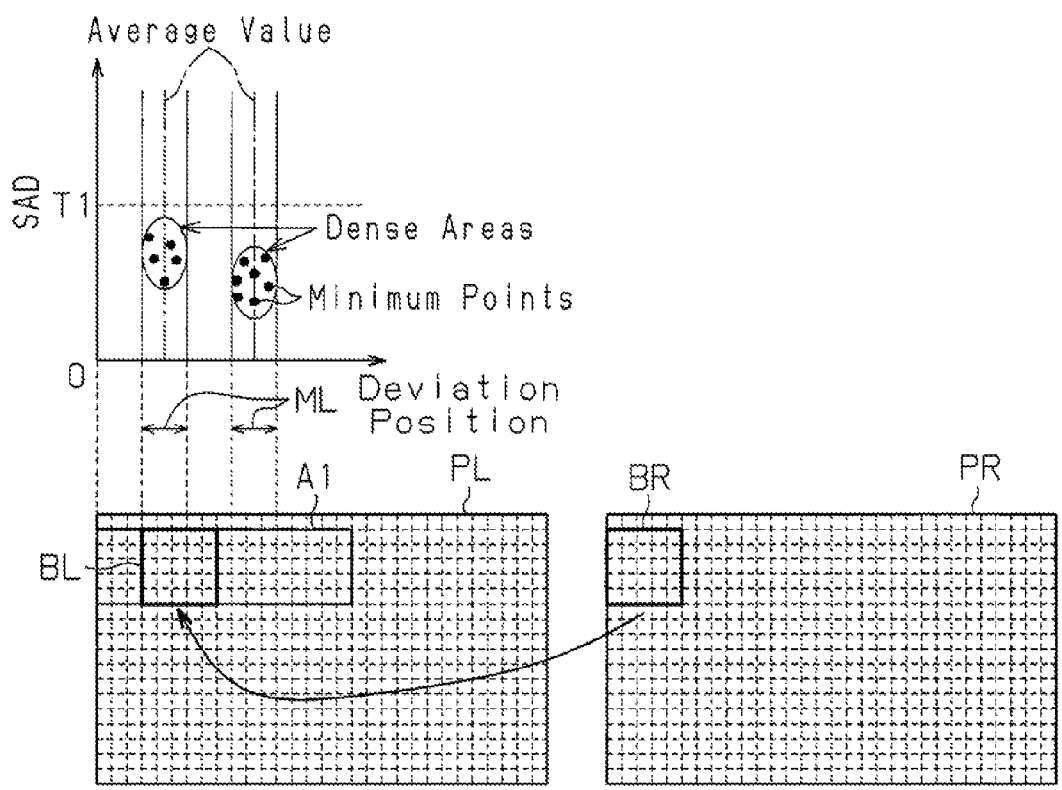

Fig.10
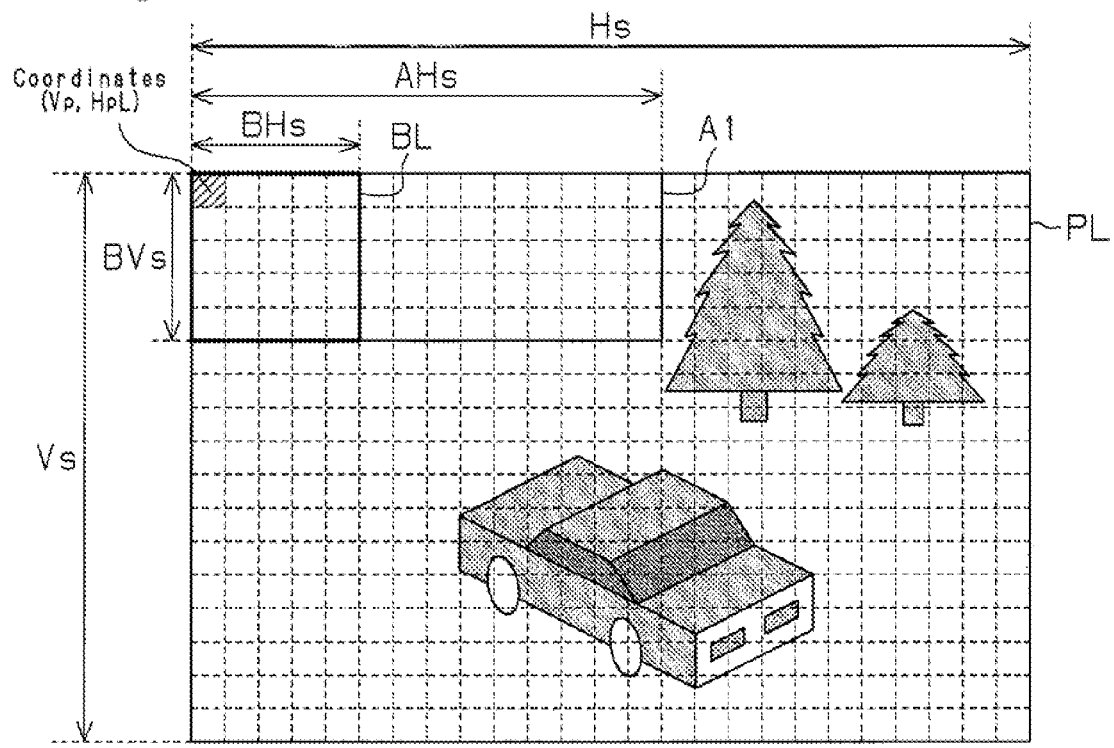
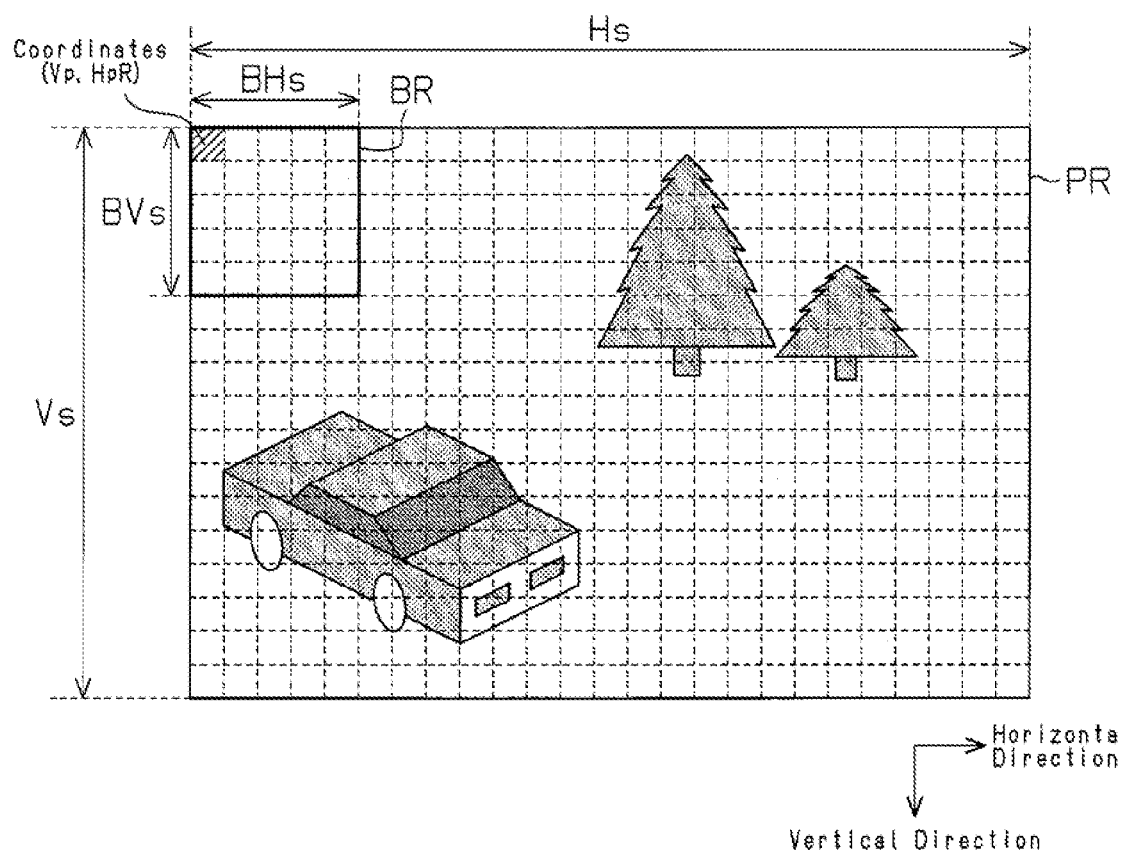

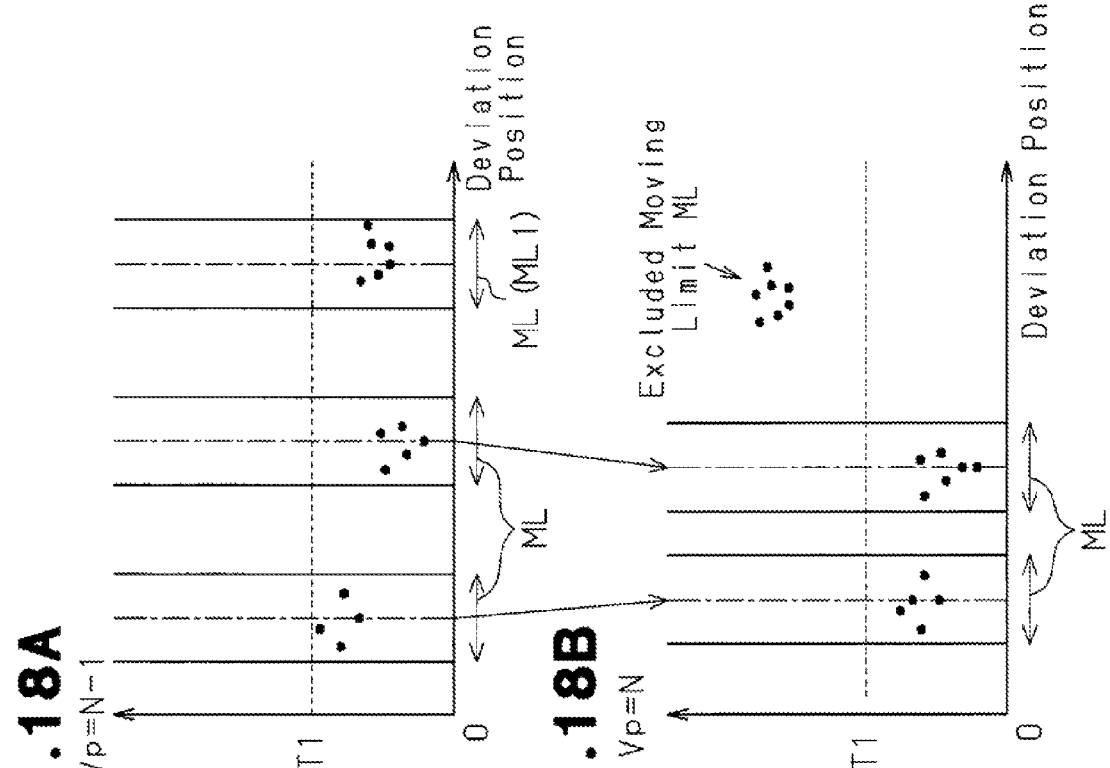
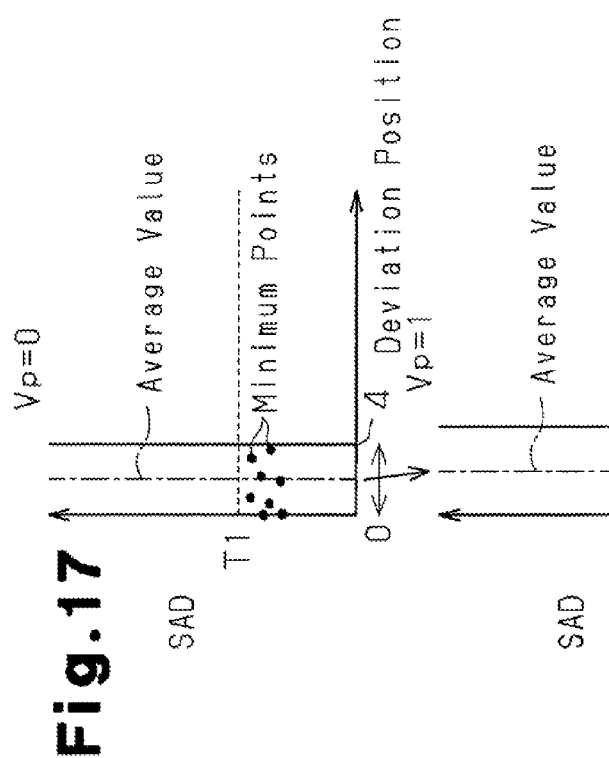
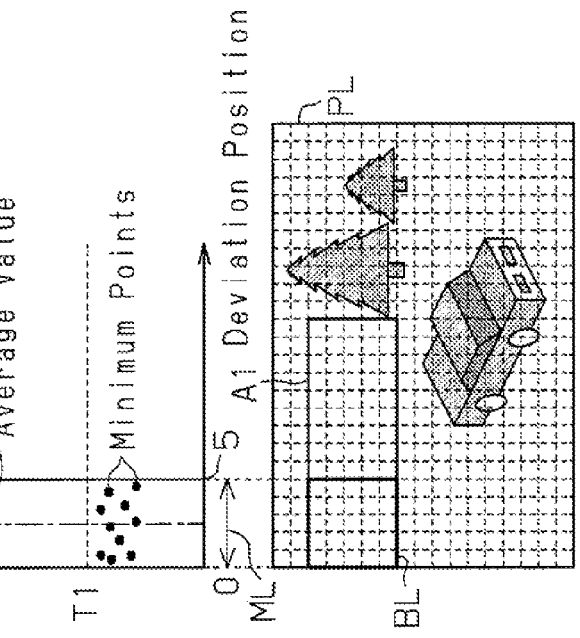

IMAGE PROCESSING DEVICE, IMAGE PROCESSING METHOD AND IMAGING DEVICE

CROSS-REFERENCE TO RELATED APPLICATIONS

This application is based upon and claims the benefit of priority from prior Japanese Patent Application No. 2011-174151, filed on Aug. 9, 2011, the entire contents of which are incorporated herein by reference.

FIELD

This disclosure relates to an image processing device, an image processing method and an imaging device.

BACKGROUND

Conventionally, there has been known a twin-lens three-dimensional display device that realizes three-dimensionality (3D) by preparing a left-eye image and a right-eye image, which form binocular parallax (refer to FIG. 22A), and independently projecting the left-eye image and the right-eye image on a left eye and a right eye of a viewer, respectively. According to such display method, a stereoscopic effect (pop-up amount) varies depending on the binocular parallax, that is, the amount of deviation between the left-eye image and the right-eye image. For example, as illustrated in FIGS. 22B and 22C, as the amount of deviation between left and right images becomes large, directions of left and right eyes viewing the image are apart from each other, resulting in a crossed position of both visual lines more distant from a screen. That is, as the amount of deviation of the left and right images becomes larger, a 3D image is displayed at a position further from the screen. As a result, the pop-up amount of the 3D image becomes large. For this reason, by calculating the amount of deviation between the left and right images and using the amount, the stereoscopic effect may be controlled, and discomfort in viewing the 3D image may be mitigated.

The amount of deviation between the left and right images is calculated, for example, by a block matching method using a sum of absolute difference of luminance signals as a standard (for example, refer to Japanese Laid-Open Patent Publication Nos. 2009-129420 and 2001-045523). According to the block matching method, as illustrated in FIG. 23A, a block BR1 of given size, which is cut from one image (here, right-eye image), is compared with a block BL1 of the other image (here, left-eye image), which is located at the same pixel, to calculate a sum of absolute luminance difference (SAD) between the pixel in the block BR1 and the pixel in the block BL1. Subsequently, as illustrated in FIG. 23B, the compared block BL1 of the left-eye image to be compared with the cut block BR1 is horizontally shifted one by one pixel and the SAD is calculated at each shift. As illustrated in FIG. 23C, the calculation of SAD (shift of the compared block BL1) is continued until the compared block BL1 reaches a terminal point of the left-eye image (a right end in FIG. 23C). Then, when the calculation of the SAD is completed at the terminal point of the left-eye image, as illustrated in FIG. 24A, the compared block BL1 corresponding to the minimum value of SAD among the calculated values of SAD is identified. The compared block BL1, which is identified as a region of the left-eye image that is the most similar to the cut block BR1, is associated with the cut block BR1. Then, a difference in horizontal coordinates between the position of the identified compared block BL1 and the position of the cut block BR1 is obtained as the amount of deviation between the left and right images (binocular parallax).

Next, as illustrated in FIG. 24B, the cut block BR1 is horizontally shifted by one pixel. Then, as described above with reference to FIGS. 23A to 23C, the compared block BL1 of the left-eye image is shifted one by one pixel to identify the position of the compared block BL1 corresponding to the minimum value of SAD, thereby calculating the amount of deviation between the left and right images. After that, as illustrated in FIG. 24C, the cut block BR1 is horizontally shifted one by one pixel until the cut block BR1 reaches a horizontal terminal point of the right-eye image (right end in FIG. 24C), and the amount of deviation between the left and right images is calculated each time the cut block BR1 is shifted.

Next, as illustrated in FIG. 25A, the cut block BR1 is returned to a horizontal start point of the right-eye image (a left end in FIG. 25A) and vertically shifted by one pixel. Then, as described above with reference to FIGS. 23A to 23C and FIGS. 24A to 24C, the amount of deviation between the left and right images is calculated. That is, each time the cut block BR1 is horizontally shifted by one pixel, the amount of deviation of the left and right images with respect to the cut block BR1 is calculated.

As illustrated in FIG. 25B, the above-mentioned processing is repeated until the cut block BR1 reaches the end point (lower right) of the right-eye image, and the amount of deviation of the left and right images is calculated at each cut block BR1.

However, according to the above-mentioned calculating method, since comparison operation (SAD calculation process) is performed with respect to all regions of the right-eye image and the left-eye image, as size of the left and right images becomes larger, processing time becomes longer.

SUMMARY

According to one aspect of this disclosure, a device for processing an image is provided. An input unit receives a first image and a second image that are taken from different positions, the first image and the second image each including a plurality of pixels arranged in a two-dimensional matrix. A first cutting unit cuts a first block of a given size from the first image at a position corresponding to a pixel in N-th row and L-th column (N and L are each an integer of 1 or larger) of the first image. A second cutting unit moves a second block of the given size by P (P is an integer of 1 or larger) pixels in a row direction, in a moving limit set in a processing area of the second image in accordance with the position of the first block, and cuts the second block from the second image in the moving limit. A correlation value calculating unit calculates a correlation value between the first block and the second block by comparing the first block with the second block each time the second block is cut. A deviation amount calculating unit calculates a largest value of the correlation value at each position of the first block and calculates an amount of deviation between the first image and the second image at each position of the first block based on a moving distance of the second block corresponding to the largest value of the correlation value. A setting unit sets the moving limit, wherein the setting unit narrows the moving limit based on the correlation value calculated in the N-th row when the amount of deviation is calculated in the (N+1)-th row of the first image.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The invention, together with objects and advantages thereof, may best be understood by reference to the following description of the presently preferred embodiments together with the accompanying drawings in which:

FIG. 1 is a block diagram illustrating an imaging device in accordance with an embodiment;

FIG. 2 is a block diagram illustrating an example of an internal structure of a deviation amount calculating unit;

FIGS. 5A and 5B are diagrams illustrating outline of the deviation amount calculation process.

FIG. 10 is a diagram illustrating various parameters.

FIG. 17 is a diagram illustrating the deviation amount calculation process.

FIGS. 18A and 18B are diagrams illustrating the deviation amount calculation process.

DESCRIPTION OF THE EMBODIMENTS

Figure 3A:
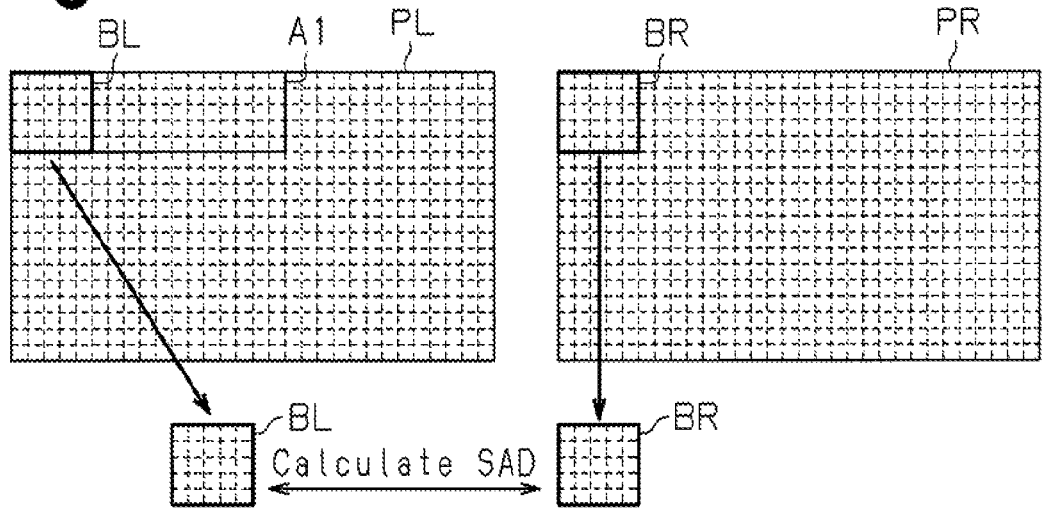
FIGS. 3A to 3C are diagrams illustrating outline of deviation amount calculation process.

An embodiment will be described below with reference to FIGS. 1 to 21.

As illustrated in FIG. 1, an imaging device 1 includes an imaging unit 10, an image processor (ISP: Image Signal Processor) 20, an input unit 41, a memory 42, and a display device 43. The imaging device 1 is, for example, a digital still camera.

The imaging unit 10 includes an imaging unit 11R for a right-eye image and an imaging unit 11L for a left-eye image. The imaging unit 11R includes an imaging optical system 12R, an imaging element unit 13R, and an analog front end (AFE) 14R. The imaging unit 11L includes an imaging optical system 12L, an imaging element unit 13L, and an AFE 14L.

The imaging optical systems 12R and 12L each include a plurality of lenses (for example, focus lenses), which focus light from a subject, and a diaphragm that adjusts the amount of light passing through these lenses, and guide an optical image of the subject to the imaging element units 13R and 13L, respectively. The imaging optical systems 12R and 12L are provided, for example, at different positions of front surface (not illustrated) of the imaging device 1.

The imaging element units 13R and 13L each include, for example, a Bayer-arranged color filter and an imaging element. The imaging element is, for example, a charge coupled device (CCD) image sensor. The imaging element generates an imaging signal (analog signal) corresponding to the amount of light incident via the color filter.

The AFEs 14R and 14L each include an A/D conversion circuit that converts the analog imaging signal output from each of the imaging element units 13R and 13L into digital image data. The digital image data is provided to the image processor 20. The AFEs 14R and 14L transmit a control signal provided from the image processor 20 to the imaging element units 13R and 13L, respectively.

The image processor 20 applies various types of image processing to the image data (Bayer data) provided from the imaging unit 10. At this time, the image processor 20 temporarily stores the image data in the memory 42 in a given processing stage. Thus, the memory 42 operates as a working memory. The memory 42 is, for example, a rewritable memory such as synchronous semiconductor memory (SDRAM: Synchronous Dynamic Random Access Memory). The image processor 20 also displays the processed image data stored in the memory 42 on the display device 43 or stores the data in a memory card 44.

A liquid crystal display (LCD) and an organic electronic luminescence (OEL) may be used as the display device 43. The memory card 44 is, for example, a portable memory card such as a compact flash (registered trademark) and an SD memory card (registered trademark).

The input unit 41 includes various switches including a shutter button operated by the user and a menu button. The various switches are used to take a photo or set photographing conditions and display modes, for example.

Next, an example of an internal structure of the image processor 20 will be described below.

The image processor 20 includes a pre-processor 21, a color processing unit 22, an image processing unit 23, an deviation amount calculating unit 24, a codec unit 25, a memory card interface (I/F) 26, a display I/F 27, a DMA arbitrating unit 28, a memory controller 29, and a CPU 30.

The pre-processor 21, the color processing unit 22, the image processing unit 23, the deviation amount calculating unit 24, the codec unit 25, the memory card I/F 26, the display I/F 27, and the DMA arbitrating unit 28 are coupled to one another via an internal bus 31. The DMA arbitrating unit 28 is coupled to the memory 42 via the memory controller 29.

The pre-processor 21 applies a correction process (preprocess) such as shading correction, flaw correction, gradient correction, and optical black (OB) level correction to the image data (RGB-format image data (Bayer data)) output from the imaging unit 10. Then, the pre-processor 21 stores the corrected image data in the memory 42 and provides the data to the deviation amount calculating unit 24. Image data obtained by applying the correction process to the image data output from the imaging unit 11R corresponds to an image (video) projected toward the right eye of the viewer and therefore, the image data is hereinafter referred to as a right-eye image PR. Image data obtained by applying the correction process to the image data output from the imaging unit 11L corresponds to an image (video) projected toward the left eye of the viewer and therefore, the image data is hereinafter referred to as a left-eye image PL.

The color processing unit 22 is, for example, a color space converting unit. The color processing unit 22 reads the RGB-format image data (Bayer data) stored in the memory 42 and converts the image data into YCbCr format image data. Then, the color processing unit 22 stores the converted image data in the memory 42.

The image processing unit 23 includes one or more processing units that executes image processing other than that in the color processing unit 22. Examples of such image processing includes resolution conversion processing of increasing/decreasing the number of pixels, color tone conversion processing of converting color into a tone such as a sepia tone, edge emphasizing processing of emphasizing contour (edge) of an image, and noise removing processing of removing noises contained in the image data.

The deviation amount calculating unit 24 receives the right-eye image PR and the left-eye image PL from the pre-processor 21, and calculates the amount of deviation (binocular parallax) between the right-eye image PR and the left-eye image PL. For example, the deviation amount calculating unit 24 associates pixels of the right-eye image PR with pixels of the left-eye image PL, thereby calculating the amount of deviation for each pixel. To associate the pixels with each other, a block related to pixels is designated on each image, a correlation value between blocks of the both images is determined, and pixels having the largest correlation value are associated with each other. Then, the deviation amount calculating unit 24 stores the calculated amount of deviation in the memory 42. The amount of deviation is used as a parameter for controlling the stereoscopic effect in three-dimensionally displaying the image data.

The codec unit 25 reads the image data stored in the memory 42, the image data is encoded in a given format (for example, Joint Photographic Experts Group (JPEG) format), and the encoded image data (encoded data) is stored in the memory 42. In the case where the imaging device 1 may take a moving image, the codec unit 25 may have a function of encoding moving image data in a given format (for example, Moving Picture Experts Group (MPEG) format).

The memory card I/F 26 is coupled to the memory card 44 attached to the imaging device 1. The memory card I/F 26 stores data stored in the memory 42 (for example, encoded image data) in the memory card 44.

The display device 43 is coupled to the display I/F 27. The display device 43 is used to two-dimensionally or three-dimensionally display the remaining amount of a battery as a driving source for the imaging device 1, shooting modes, shooting frames and stored image data. For example, the display I/F 27 reads the image data stored in the memory 42 and provides the image data to the display device 43. When three-dimensionally displaying image data taken by the imaging units 11R and 11L, the display I/F 27 reads the right-eye image PR, the left-eye image PL, and the amount of deviation, which are stored in the memory 42, and three-dimensionally displays the right-eye image PR and the left-eye image PL on the display device 43 on the basis of the amount of deviation.

Here, various methods may be used as a three-dimensional display method. For example, it is possible to adopt a method of displaying the right-eye image PR and the left-eye image PL side by side, thereby achieving three-dimensionality by a naked-eye parallel method. Alternatively, it is possible to adopt a method of adhering a lenticular lens to the display device 43 and displaying the right-eye image PR and the left-eye image PL at given positions on a display surface of the display device 43, thereby making the left-eye image PL and the right-eye image PR incident on the left eye and the right eye of the viewer, respectively, to achieve three-dimensional display.

The pre-processor 21, the color processing unit 22, the image processing unit 23, the deviation amount calculating unit 24, the codec unit 25, The memory card I/F 26, and the display I/F 27 include memory access controllers (DMAC: Direct Memory Access Controller) 21a, 22a, 23a, 24a, 25a, 26a, 27a, respectively. The DMACs 21a to 27a each output an access request corresponding to processing executed by the processing units 21 to 27. For example, the pre-processor 21 stores the image data output from the imaging unit 10 in the memory 42. In this case, the DMAC 21a of the pre-processor 21 outputs a write request. The display I/F 27 reads image data displayed on the display device 43 from the memory 42. In this case, the DMAC 27a of the display I/F 27 outputs a read request.

In the case where the requests output from the DMACs 21a to 27a of the processing units 21 to 27 compete, the DMA arbitrating unit 28 arbitrates the requests in accordance with priority set for the processing units 21 to 27, and allows one processing unit to make an access. The processing unit, access of which is allowed, outputs a control signal for an access to the memory 42. For example, with the read request, the memory controller 29 reads data from the memory 42 in accordance with the control signal, and provides the read data to a requesting source. With the write request, the memory controller 29 transfers data provided from the source of the write request to the memory 42, and the memory 42 stores the data therein.

The CPU 30 serves to control the whole of the image processor 20, and performs analysis of data and images, setting necessary information at respective processing units on the basis of an analysis result, and data write/read control. The CPU 30 generates control signals to instruct reset of the imaging element units 13R and 13L (CCD image sensors) and provides the control signals to the imaging element units 13R and 13L through the AFEs 14R and 14L. Operational information set/designated by various switches of the input unit 41 is provided to the CPU 30.

Next, an example of an internal structure and operations of the deviation amount calculating unit 24 will be described below.

First, outline of the deviation amount calculation process by the deviation amount calculating unit 24 will be described.

As illustrated in FIG. 3A, first, two pieces of image data taken by the imaging units 11R and 11L, that is, the right-eye image PR and the left-eye image PL that are taken from different positions (visual points) are acquired. Each of the right-eye image PR and the left-eye image PL is image data including a plurality of pixels two-dimensionally arranged in a horizontal direction (row direction) and a vertical direction (column direction). That is, the pixels of image data are arranged in a two-dimensional matrix.

In the operational processing of pixels at a first vertical position (here, the deviation amount calculation process of pixels in a first row), a cut block BR having a given size is cut from a horizontal starting point (the first column) of one image data (here, right-eye image PR). For comparison with the cut block BR, a compared block BL having the same size as the cut block BR is cut from a starting point (here, the first row, the first column) in a processing area A1 of the other image data (here, left-eye image PL). Then, a sum of absolute difference (SAD) that represents a sum of absolute luminance difference between pixels in the cut block BR and pixels in the compared block BL is calculated. The processing area A1 is an area where the compared block BL to be compared with each cut block BR is selected to calculate the amount of deviation at the position of each cut block BR. That is, the area of the left-eye image PL corresponding to each cut block BR is searched in the processing area A1. The processing area A1 is set according to the position of each cut block BR.

Figure 3B:
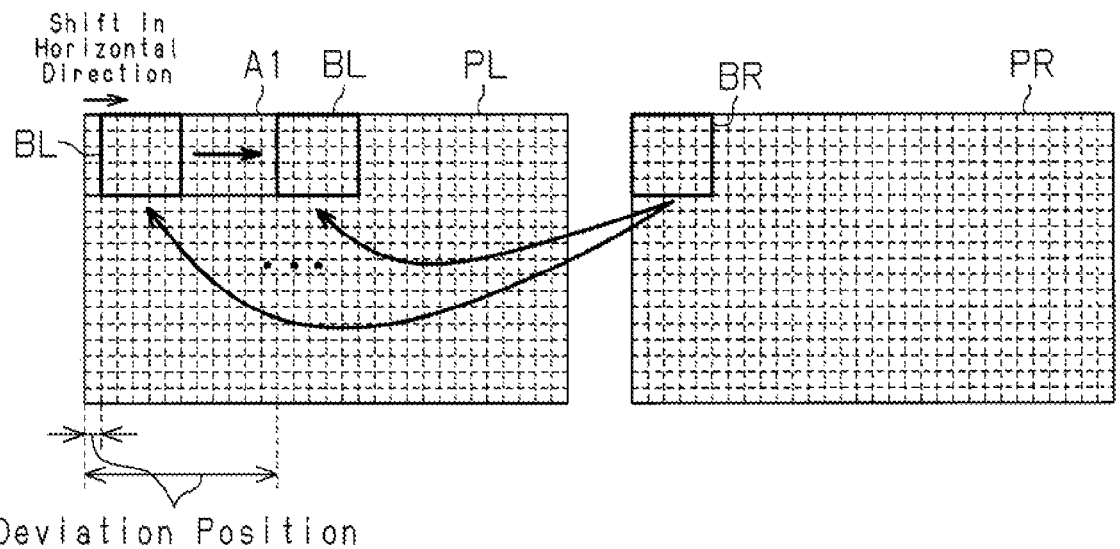
Figure 3C:
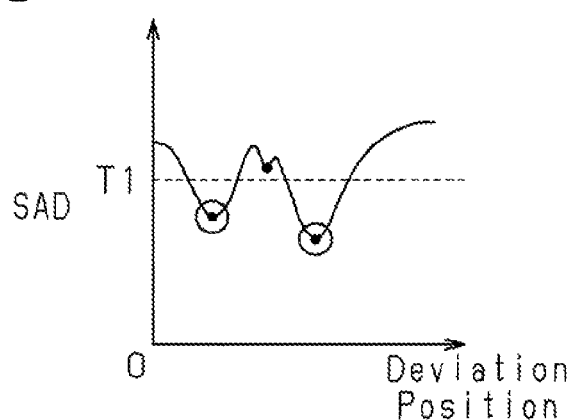

Subsequently, as illustrated in FIG. 3B, the compared block BL is horizontally shifted (moved) one by one pixel in the processing area A1, and the sum of absolute difference (SAD) is calculated each time the compared block BL is shifted. The SAD calculation process is continued until the compared block BL reaches a terminal point of the processing area A1. Then, a smallest value of SAD is determined among the calculated values of SAD, and the amount of deviation between the both images PR and PL at the position of the current cut block BR is calculated based on the position of the compared block BL corresponding to the smallest value of SAD and the position of the current cut block BR. At this time, as illustrated in FIG. 3C, in a graph representing a deviation position between the cut block BR and the compared block BL as a horizontal axis and magnitude of the SAD as a vertical axis, all values of SAD calculated from all blocks in the processing area A1 in the horizontal direction are plotted, and the plotted points are coupled to each other with a curve. Then, for example, as illustrated in FIG. 3C, a curve having a plurality of minimum points (minimum values) is formed. Then, magnitude of the SAD at each minimum point is compared with a preset determination level T1, and the minimum point at which the value of SAD is lower than the determination level T1 is extracted. In an example illustrated in FIG. 3C, two minimum points are extracted (refer to circles).

Figure 4A:
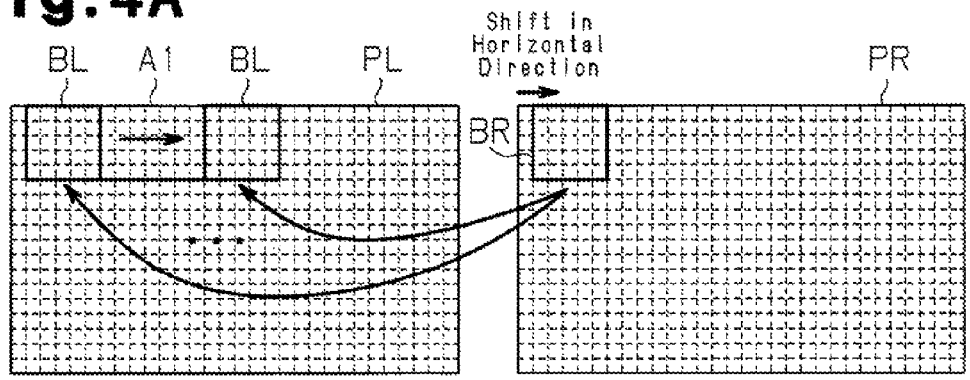
FIGS. 4A to 4D are diagrams illustrating outline of the deviation amount calculation process.
Figure 4B:
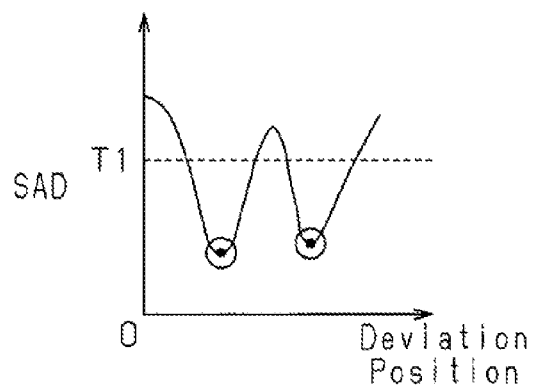

Next, as illustrated in FIG. 4A, a cutting position of the cut block BR from the right-eye image PR is horizontally shifted by one pixel. Then, in the same manner as described above, the amount of deviation is calculated at the position of the shifted cut block BR and as illustrated in FIG. 4B, the minimum point(s) at which the value of SAD is lower than the determination level T1 is extracted. In the example illustrated in FIG. 4B, the two minimum points are extracted.

Figure 4C:
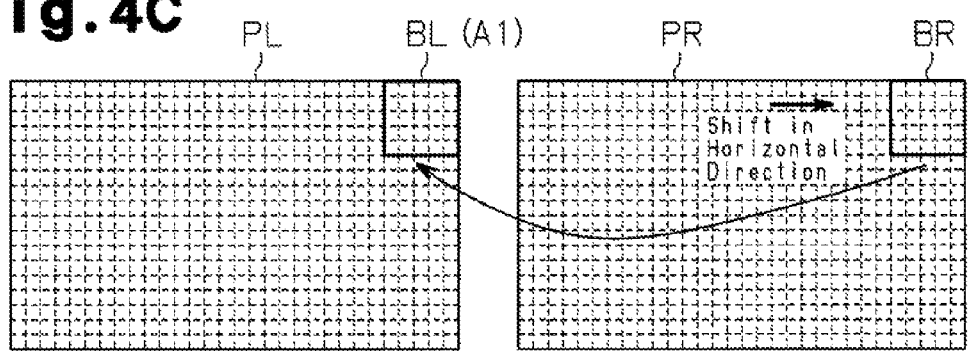
Figure 4D:
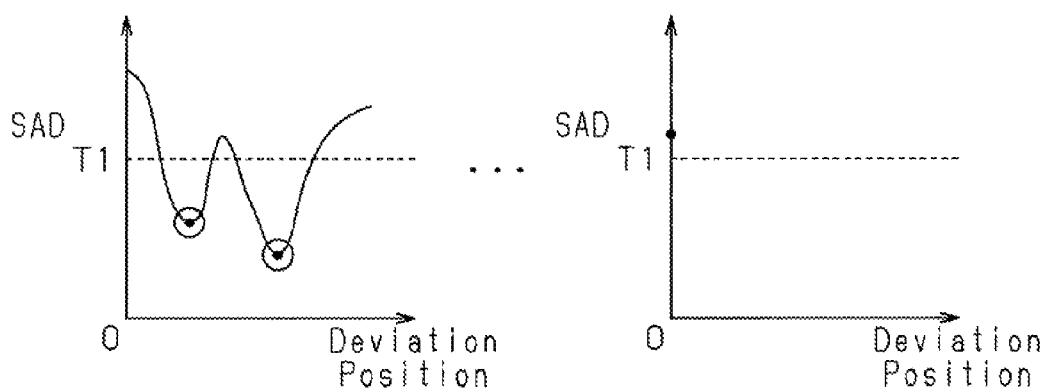

Thereafter, as illustrated in FIG. 4C, the same processing is repeated until the cutting position of the cut block BR reaches a terminating point (a point at which the right end of cut block BL matches the right end of the right-eye image BR). That is, the amount of deviation is calculated at the position of the cut block BR each time the cut block BR is horizontally shifted one by one pixel, and as illustrated in FIG. 4D, the minimum point(s) is extracted at the position of each cut block BR.

In this manner, in the deviation amount calculation process of pixels in the first row, the compared block BL is horizontally shifted one by one pixel from the starting point to the terminating point in the processing area A1 corresponding to each cut block BR. Then, the SAD is calculated at the position of each compared block BL in the whole horizontal area of the processing area A1, and the amount of deviation is calculated at the position of the current cut block BR. Further, the position of the cut block BR is horizontally shifted one by one pixel from the starting point to the terminating point in the right-eye image PR, and the amount of deviation is calculated at the position of each cut block BR corresponding to each pixel in the first row. At this time, in this embodiment, at the position of each cut block BR, the amount of deviation is calculated and the minimum point(s) of the SAD value is also extracted.

FIG. 5A illustrates all minimum points extracted at the position of each cut block BR corresponding to the respective pixels in the first row together in one graph. Based on the graph, a moving limit ML of the compared block BL moved with respect to the position of each cut block BR corresponding to the respective pixels in the second and subsequent rows is narrowed. For example, an area where the minimum points are dense is determined as a dense area on the graph in FIG. 5A, a pixel area of the deviation position, which corresponds to the dense area, is set to the moving limit ML of the compared block BL. In this case, an average value of the deviation position at the minimum points in the dense area is determined, and the pixel area including X pixels before and after the average value of the deviation position may be set to the moving limit ML of the compared block BL. As illustrated in FIG. 5A, when there exists a plurality of dense areas, a plurality of moving limits ML corresponding to the dense areas are set in the processing area A1.

Subsequently, as illustrated in FIG. 5B, the cut block BR is cut from the starting point (the first column) in the second row of the right-eye image PR. Further, the compared block BL to be compared with the cut block BR is cut in the moving limit ML set in the processing area A1. For example, in FIG. 5B, cutting of the compared block BL is skipped in the pixel area corresponding to the deviation position of zero to two pixels, and the compared block BL starts to be cut from the pixel area corresponding to the deviation position of three pixels. Then, the cut block BR is compared with the compared block BL to calculate the SAD. Thereafter, the compared block BL is shifted by one pixel and cut in the moving limit ML, and the compared block BL is compared to the cut block BR to sequentially calculate the SAD. Then, the amount of deviation at the position of the current cut block BR (the second row and the first column) is calculated based on the values of SAD obtained in the moving limit ML. In this manner, in the deviation amount calculation process of each pixel in the second and subsequent rows, the moving limit ML of the compared block BL is narrowed and therefore, the number of compared blocks BL cut from the left-eye image PL decreases. Accordingly, the amount of computation for calculating the amount of deviation is reduced. This may shorten whole processing time of the deviation amount calculation process.

Next, an example of an internal structure of the deviation amount calculating unit 24 will be described below.

As illustrated in FIG. 2, the deviation amount calculating unit 24 includes a memory 51, a register 52, a memory control unit 53, a sum of absolute difference (SAD) operating unit 54, a comparator 55, and an operation control unit 56.

The image data output from the imaging unit 11R is subjected to various types of correction process in the pre-processor 21 to form image data (right-eye image PR). The memory 51 stores the right-eye image PR. At this time, a memory control unit 32 designates an address in a first storage area for storing the right-eye image PR in the memory 51. Accordingly, the right-eye image PR is stored in the first storage area of the memory 51. The image data output from the imaging unit 11L is subjected to various types of correction process in the pre-processor 21 to form the image data (left-eye image PL). The memory 51 stores the left-eye image PL. At this time, the memory control unit 32 designates an address in the second storage area for storing the left-eye image PL in the memory 51. Accordingly, the left-eye image PL is stored in the second storage area in the memory 51. In FIG. 2, the right-eye image PR and the left-eye image PL are directly stored from the pre-processor 21 to the memory 51. However, the right-eye image PR and the left-eye image PL may be read from the memory 42 and then, stored in the memory 51. Further, although the memory 51 is built in the deviation amount calculating unit 24 in FIG. 2, the memory 51 may be omitted, and the memory 42 arranged outside of the deviation amount calculating unit 24 may be used in lieu of the memory 51.

The register 52 holds various parameters such as size of each of the right-eye image PR and the left-eye image PL, size of each of the cut block BR and the compared block BL, size of the processing area A1, and the determination level T1 to be compared with the values of the minimum points of SAD. Based on a control signal of the CPU 30 (refer to FIG. 1), a signal to instruct start and stop of the deviation amount calculation process is provided from the register 52 to the imaging units 11R and 11L, the pre-processor 21, and the memory control unit 32 and 53. Further, based on a control signal of the CPU 30, a signal indicating the size of each of the right-eye image PR and the left-eye image PL, a signal indicating the size of each of the cut block BR and the compared block BL, and a signal indicating the size of the processing area A1 are provided from the register 52 to the memory control unit 53. Further, based on a control signal of the CPU 30, a signal indicating the determination level T1 is provided from the register 52 to the operation control unit 56, so that the minimum point having the value of SAD that is lower than the determination level T1 is determined by the operation control unit 56.

Based on the signal from the register 52 indicating the size of the cut block BR, the memory control unit 53 provides the memory 51 with a read address for reading a part of the right-eye image PR stored in the memory 51 as the cut block BR. Further, based on the signal from the register 52 indicating the size of the compared block BL and the size of the processing area A1, the memory control unit 53 provides the memory 51 with a read address for reading a part of the left-eye image PL stored in the memory 51 as the compared block BL from the processing area A1. Further, based on a skip signal SS from the operation control unit 56, the memory control unit 53 provides the memory 51 with a read address for reading a part of the left-eye image PL stored in the memory 51 as the compared block BL in the moving limit ML from the processing area A1. The skip signal SS is a signal to instruct skip of the deviation amount calculation process in an area other than the moving limit ML in the processing area A1 (refer to FIGS. 5A and 5B). Base on each of the read addresses, the memory 51 provides the SAD operating unit 54 with the cut block BR of the right-eye image PR and the compared block BL of the left-eye image PL.

The memory control unit 53 also provides the read addresses to the comparator 55 and the operation control unit 56. Further, the memory control unit 53 provides an end signal ES indicating that movement of the compared block BL in the processing area A1 has been finished to the comparator 55 and the operation control unit 56. Further, the memory control unit 53 provides an address indicating coordinates of a reference pixel of the cut block BR to be calculated (for example, the upper left pixel in the block BR) to the memory 42.

The SAD operating unit 54 compares the cut block BR of the right-eye image PR and the compared block BL of the left-eye image PL, which are read from the memory 51, to calculate the SAD, that is, the sum of the absolute luminance difference between the both blocks BR and BL. The SAD operating unit 54 provides the calculated value of the SAD to the comparator 55 and the operation control unit 56.

The comparator 55 includes an embedded memory 55a that stores the values of SAD output from the SAD operating unit 54. The comparator 55 compares the values of SAD stored in the embedded memory 55a with each other at the position of each cut block BR to determine the smallest value of SAD. Then, the comparator 55 calculates the amount of deviation at the position of the cut block BR on the basis of the horizontal position of the cut block BR and the horizontal position of the compared block BL corresponding to the smallest value of SAD, and stores the amount of deviation in the memory 42.

Figure 6:
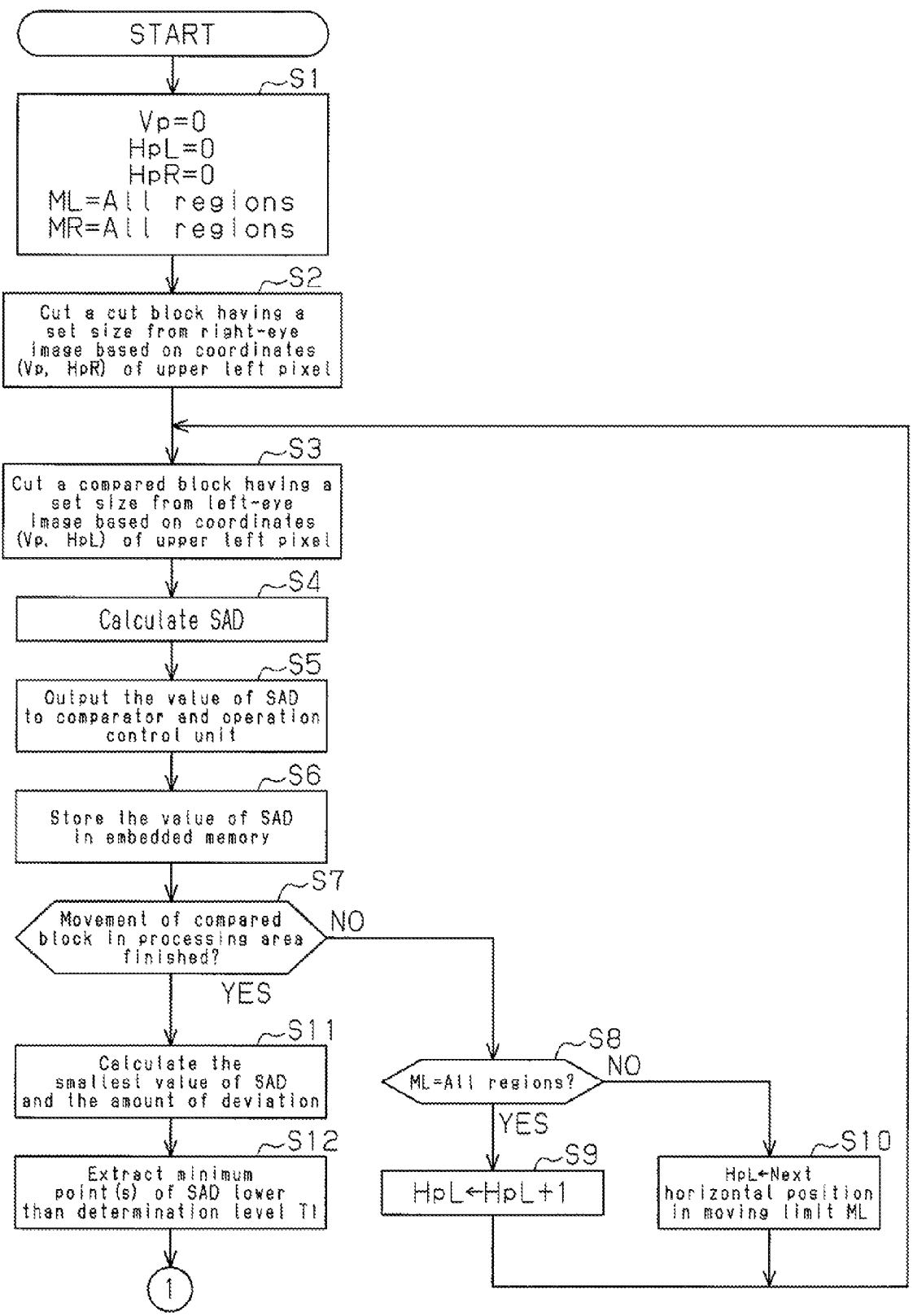
FIG. 6 is a flow chart illustrating a deviation amount calculation process method.
Figure 7:
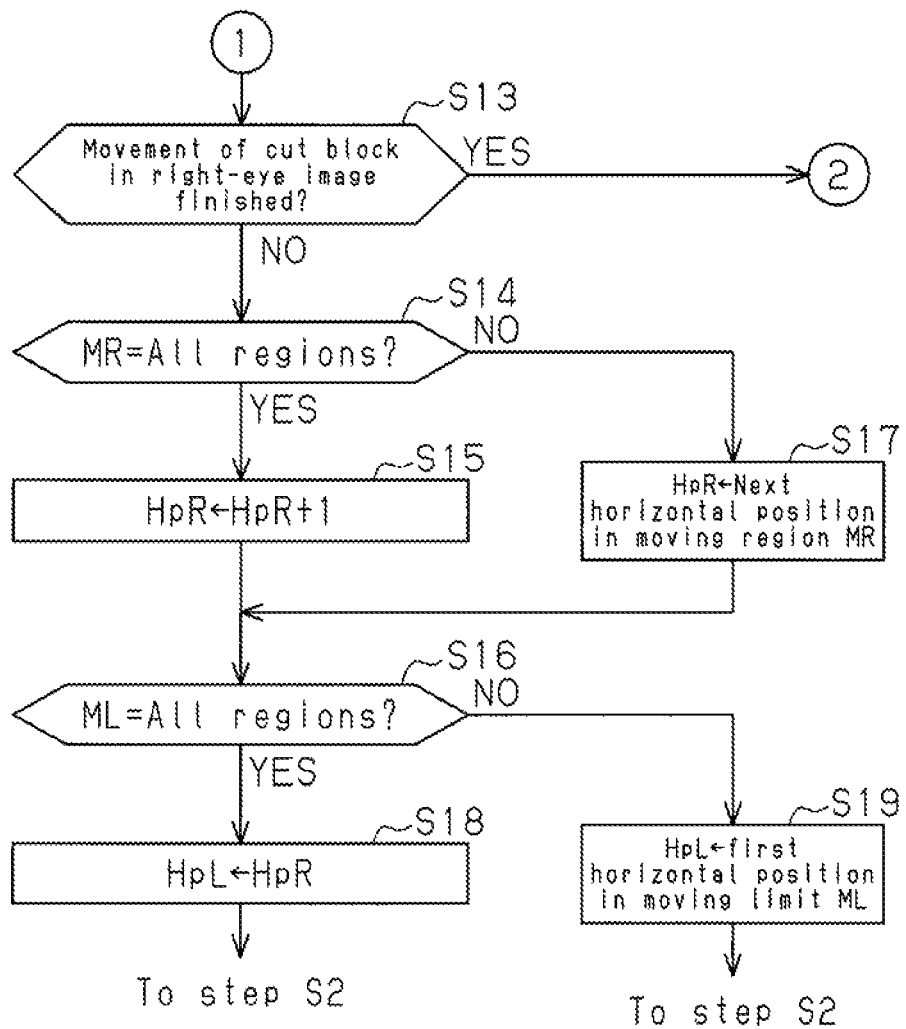
FIG. 7 is a flow chart illustrating the deviation amount calculation process method.
Figure 8:
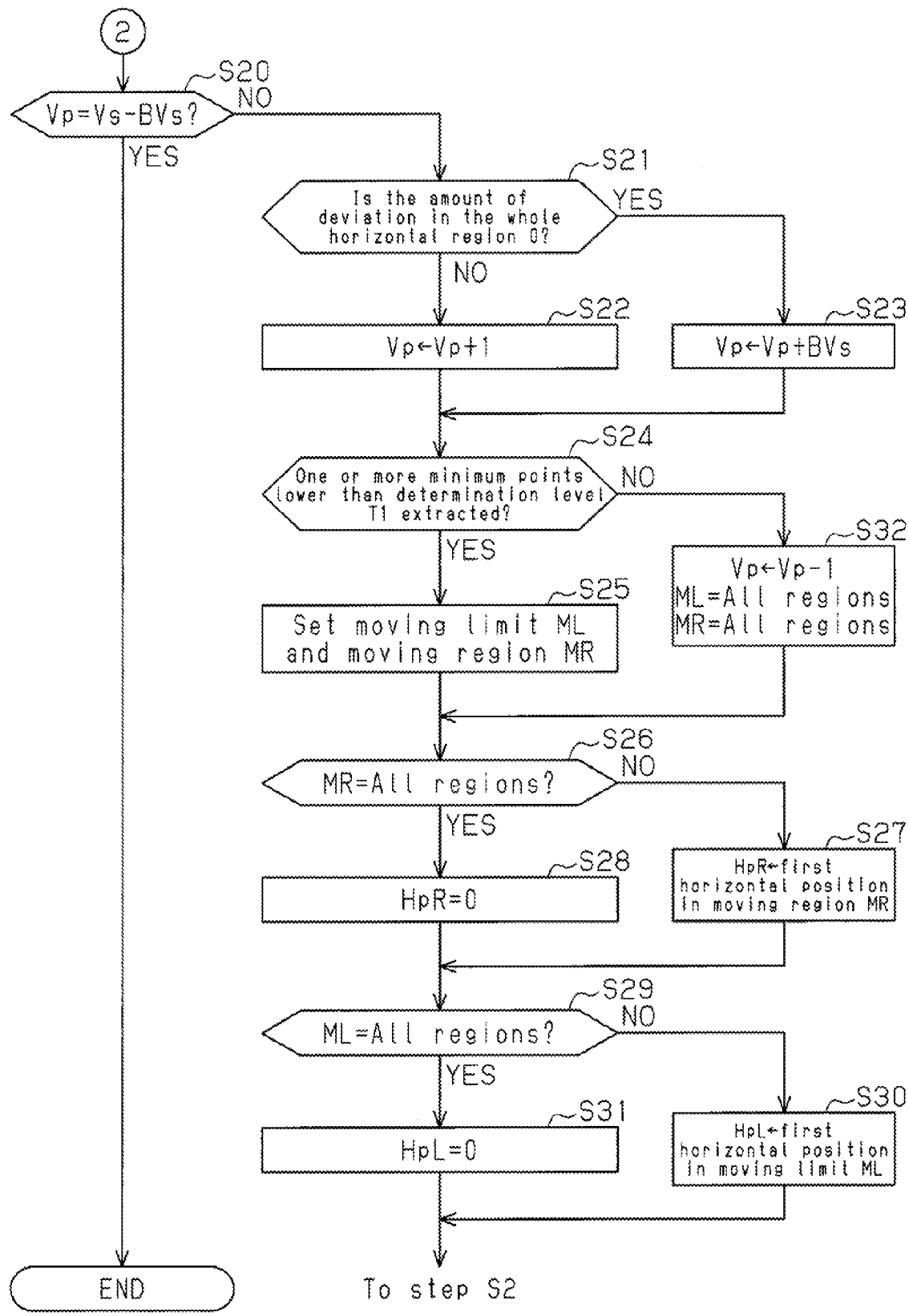
FIG. 8 is a flow chart illustrating the deviation amount calculation process method.

The operation control unit 56 controls the deviation amount calculating unit 24, and executes process in the flow charts illustrated in FIGS. 6 to 8. The operation control unit 56 includes an embedded memory 56a that stores the values of SAD output from the SAD operating unit 54. The operation control unit 56 compares the values of SAD stored in the embedded memory 56a with each other at the position of each cut block BR to determine one or more minimum points of the SAD. The operation control unit 56 compares the values of SAD corresponding to the minimum points with the determination level T1 provided from the register 52, and extracts one or more minimum points that are lower than the determination level T1. The operation control unit 56 stores the extracted minimum points in the embedded memory 56a. The operation control unit 56 determines the dense area of the minimum points (deviation position area) on the basis of the minimum points stored in the embedded memory 56a, and sets the moving limit ML of the compared block BL (refer to FIGS. 5A and 5B) on the basis of the dense area. Then, the operation control unit 56 generates the skip signal SS for skipping cutting of the compared block BL from the pixel area other than the moving limit ML set in the processing area A1, and provides the skip signal SS to the memory control unit 53. The skip signal SS includes a skip pulse to instruct skipping of an address (read address) for cutting the compared block BL and a skip address indicating an address (read address) after skipping. The minimum points stored in the embedded memory 56a are reset each time the deviation amount calculation process of each row of the right-eye image PR is terminated.

The deviation amount calculating unit 24 is an example of the image processing device, the memory 51 is an example of an input unit, the memory control unit 53 is an example of a first cutting unit and a second cutting unit, the SAD operating unit 54 is an example of a correlation value calculating unit, the comparator 55 is an example of a deviation amount calculating unit. The operation control unit 56 is an example of a setting unit, an extracting unit, a first control unit, and a second control unit. The right-eye image PR is an example of a first image, the left-eye image PL is an example of a second image, the cut block BR is an example of a first block, and the compared block BL is an example of a second block. The smallest value of SAD, which is determined by the comparator 55, is an example of a largest value of the correlation value between the first and second blocks.

Figures 9A, 9B:
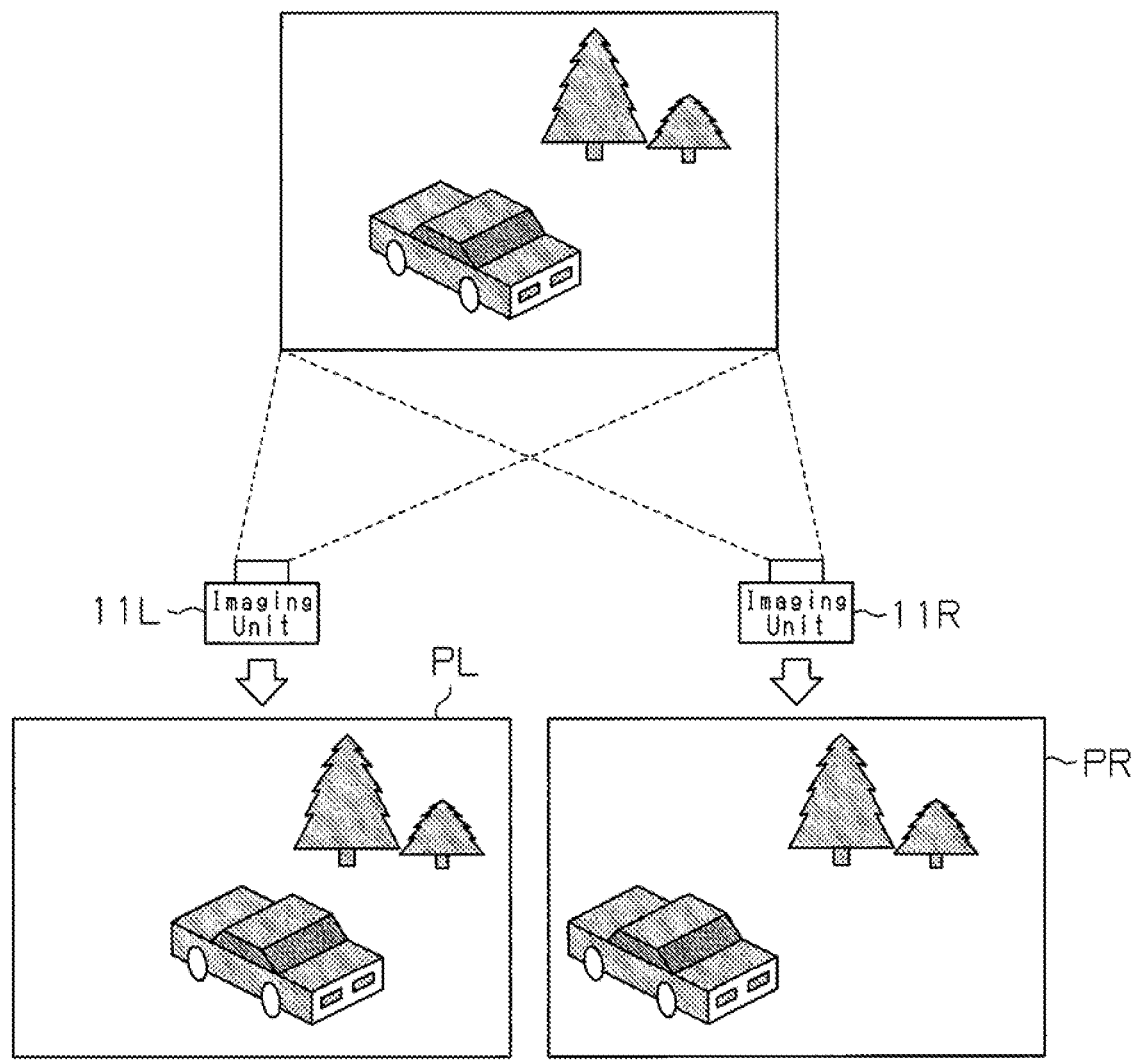
FIGS. 9A and 9B are diagrams illustrating a right-eye image and a left-eye image.

Next, the operation of the deviation amount calculating unit 24 (especially, the operation control unit 56), that is, a deviation amount calculation process will be described with reference to FIGS. 6 to 21. Here, the case where a scene illustrated in FIG. 9A is taken by the imaging units 11R and 11L, that is, the same scene is taken from different positions, and the left-eye image PL and the right-eye image PR are obtained as illustrated in FIG. 9B will be described as an example. It is assumed that the two trees are located away from the shooting positions, while the vehicle is located near the shooting positions.

Figure 11A:
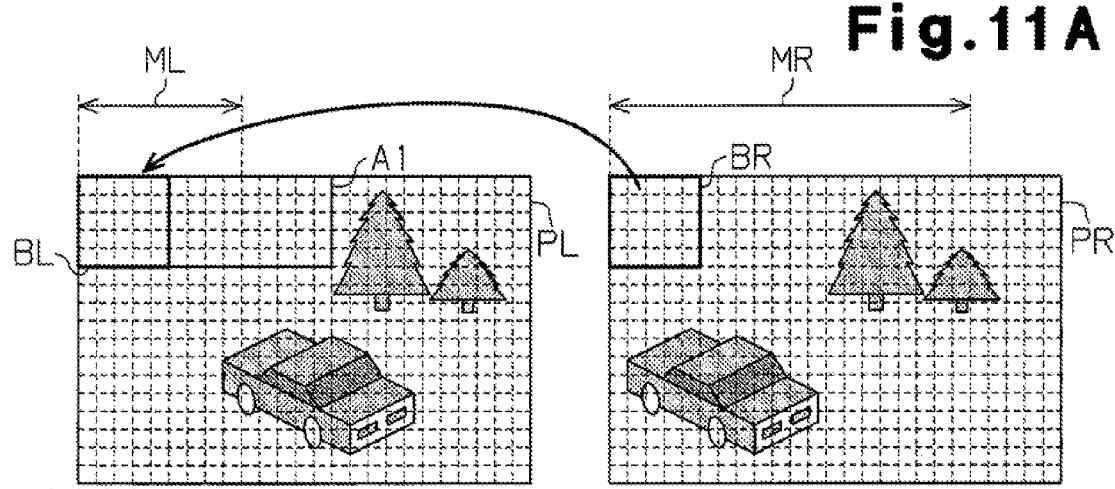
FIGS. 11A to 11D are diagrams illustrating the deviation amount calculation process.

First, as illustrated in FIG. 6, in step S1, the memory control unit 53 and the operation control unit 56 initialize various parameters. For example, as illustrated in FIG. 10, a vertical position Vp and a horizontal position HpR that indicate coordinates of the upper left pixel of the cut block BR are set to 0 (zero), and a vertical position Vp and a horizontal position HpL that indicate coordinates of the upper left pixel of the compared block BL are set to 0 (zero). The moving limit ML of the compared block BL to be compared with the cut block BR is set for the whole of processing area A1 in the horizontal direction. In this case, the compared block BL is cut while being moved in the whole of processing area A1 in the horizontal direction. Here, the cut block BR and the compared block BL each have a vertical block size BVs and a horizontal block size BHs, and the processing area A1 has a vertical block size BVs and a horizontal block size AHs. When the moving limit ML is set to the whole of the processing area A1, as illustrated in FIG. 11A, the moving limit ML is set to a size obtained by subtracting the horizontal block size BHs of the compared block BL from the horizontal block size AHs of the processing area A1. The starting point of the moving limit ML after initialization is the left end of the processing area A1. Further, in initialization in step S1, a moving region MR of the cut block BR is set to the whole area of the right-eye image PR in the horizontal direction. In this case, the cut block BR is cut while being moved in the whole horizontal area of the right-eye image PR. Here, the left-eye image PL and the right-eye image PR each have a vertical size Vs and a horizontal size Hs. When the moving region MR is set to the whole area of the right-eye image PR, the moving region MR is set to a size obtained by subtracting the horizontal block size BHs of the cut block BR from the horizontal size Hs of the right-eye image PR. The starting point of the moving region MR after initialization is the left end (the first column) of the right-eye image PR.

In this embodiment, the block size BVs×BHs of each of the cut block BR and the compared block BL is set to 5 pixels×5 pixels, and the size of the processing area A1 (initial value) BVs×AHs is set to 5 pixels×14 pixels.

Next, in step S2 illustrated in FIG. 6, based on the coordinates (Vp, HpR) of the upper left pixel of the cut block BR, the cut block BR having the block size (BVs×BHs) is cut (read) from the right-eye image PR stored in the memory 51. Here, the coordinates (Vp, HpR) are set to coordinates (0, 0). Accordingly, as illustrated in FIG. 11A, the cut block BR of the block size (BVs×BHs) is cut from the upper left of the right-eye image PR.

Subsequently, in step S3 illustrated in FIG. 6, based on the coordinates (Vp, HpL) of the upper left pixel of the compared block BL, the compared block BL having the block size (BVs×BHs) is cut (read) from the left-eye image PL stored in the memory 51. Here, the coordinates (Vp, HpL) are set to coordinates (0, 0). Accordingly, as illustrated in FIG. 11A, the compared block BL having the block size (BVs×BHs) is cut from the upper left of the left-eye image PL.

Next, the SAD operating unit 54 performs SAD operation based on the cut block BR and the compared block BL to calculate the SAD (step S4 in FIG. 6). Subsequently, the SAD operating unit 54 outputs the calculated value of SAD to the comparator 55 and the operation control unit 56 (step S5). The comparator 55 stores the value of SAD in the embedded memory 55a, and the operation control unit 56 stores the value of SAD in the embedded memory 56a (step S6).

Next, the memory control unit 53 determines whether or not movement of the compared block BL in the processing area A1 is finished (step S7). Here, when the horizontal position HpL of the upper left pixel of the compared block BL matches a value obtained by subtracting the horizontal block size BHs of the compared block BL from the horizontal position of the upper right pixel in the processing area A1, the movement of the compared block BL in the processing area A1 is finished. The horizontal position of the upper right pixel in the processing area A1 may be calculated by adding the horizontal block size AHs of the processing area A1 to the horizontal position of the upper left pixel in the processing area A1.

Figure 11B:
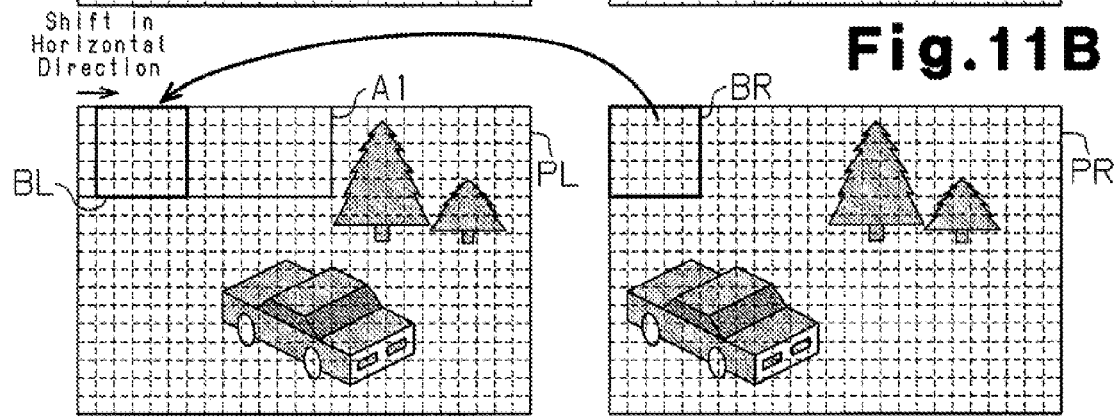

In step S7, when the movement of the compared block BL is not finished (NO in step S7), it is determined whether or not the moving limit ML of the compared block BL is set to the whole of the processing area A1 (step S8). Here, in initialization in step S1, the moving limit ML is set to the whole of the processing area A1 (YES in step S8). In this case, a value "1" is added to the horizontal position HpL of the upper left pixel of the compared block BL (step S9), and the process returns to step S3. Accordingly, as illustrated in FIG. 11B, the compared block BL is cut at the position where the compared block BL is horizontally shifted by one pixel in the processing area A1 (moving limit ML) (step S3). Then, in the same manner as described above, the SAD is calculated based on the cut block BR and the compared block BL (step S4), and the value of SAD is stored in the embedded memory 55a of the comparator 55 and the embedded memory 56a of the operation control unit 56 (steps S5 and S6). In step S8, when the moving limit ML of the compared block BL is set to a part of the processing area A1 (NO in step S8), the horizontal position HpL is set to a value indicating the next horizontal position in the moving limit ML (step S10). Then, the process returns to step S3.

Figure 11C:
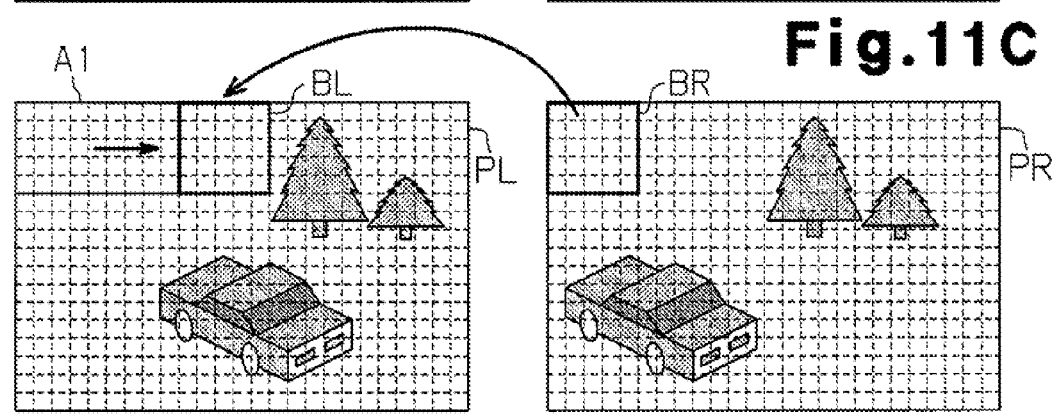

Thereafter, the process in steps S3 to S9 is repeated until movement of the compared block BL in the processing area A1 is finished. Thereby, each time the compared block BL is horizontally shifted by one pixel in the processing area A1, the SAD is calculated. Then, as illustrated in FIG. 11C, when the compared block BL moves to a terminal point of the processing area A1 and the SAD is calculated at the terminal point, it is determined that movement of the compared block BL in the processing area A1 is finished (YES in step S7). At this time, as illustrated in FIG. 11C, the upper right pixel of the compared block BL matches the upper right pixel of the processing area A1. Further, the upper left pixel of the compared block BL matches a value obtained by subtracting the horizontal block size BHs of the compared block BL from the horizontal position of the upper right pixel in the processing area A1. The end signal ES is provided from the memory control unit 53 to the comparator 55 and the operation control unit 56.

Next, in step S11 illustrated in FIG. 6, the comparator 55 compares the values of SAD stored in the embedded memory 55a with each other to calculate the smallest value of SAD. Then, the comparator 55 calculates a moving distance of the compared block BL corresponding to the smallest value of SAD as the amount of deviation between the right-eye image PR and the left-eye image PL at the position of the current cut block BR. The comparator 55 outputs the calculated amount of deviation to the memory 42.

Figure 11D:
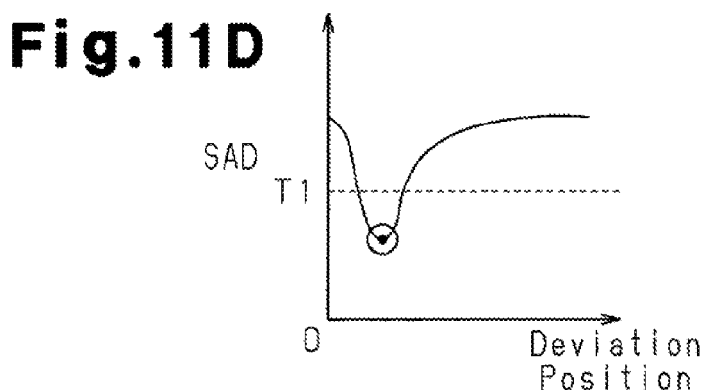

Subsequently, in step S12, the operation control unit 56 calculates one or more minimum points among the values of SAD stored in the embedded memory 56a at the position of the current cut block BR. For example, as illustrated in FIG. 11D, the values of SAD are plotted on a graph representing the deviation position of the compared block BL relative to the cut block BR (the moving distance of the compared block BL) as a horizontal axis and the magnitude of the SAD as a vertical axis, and the minimum points of the SAD are calculated based on a curve connecting the plotted points to each other. Then, the operation control unit 56 compares the minimum points of the SAD with the determination level T1 provided from the register 52, and extracts one or more minimum points of the SAD lower than the determination level T1. The values of SAD and the deviation position at the extracted minimum points are stored in the embedded memory 56a.

Next, in step S13 illustrated in FIG. 7, the memory control unit 53 determines whether or not movement of the cut block BR in the horizontal direction in the right-eye image PR is finished. Here, when the horizontal position HpL of the upper left pixel of the cut block BR matches a value obtained by subtracting the horizontal block size BHs of the cut block BR from the horizontal size Hs of the right-eye image PR, horizontal movement of the cut block BR is finished. When horizontal movement of the cut block BR is not finished (NO in step S13), it is determined in step S14 whether or not the moving region MR of the cut block BR is set to the whole area of the right-eye image PR. At this time, in initialization in step S1, the moving region MR is set to the whole area of the right-eye image PR (YES in step S14). In this case, a value "1" is added to the horizontal position HpR of the upper left pixel of the cut block BR (step S15). After that, the process proceeds to step S16. In step S14, when the moving region MR of the cut block BR is set to partial area of the right-eye image PR (NO in step S14), after execution of the process in step S17, the process proceeds to step S16.

Subsequently, in step S16, it is determined whether or not the moving limit ML of the compared block BL is set to the whole of the processing area A1. Here, in initialization in step S1, the moving limit ML is set to the whole of the processing area A1 (YES in step S16). Then, in following step S18, the horizontal position HpL of the upper left pixel of the compared block BL is set so as to be equal to the horizontal position HpR of the upper left pixel of the cut block BR (HpL=HpR). After that, the process returns to step S2. In step S16, when the moving limit ML of the compared block BL is set to a part of the processing area A1 (NO in step S16), after execution of the process in step S19, the process returns to step S2.

Figure 12A:
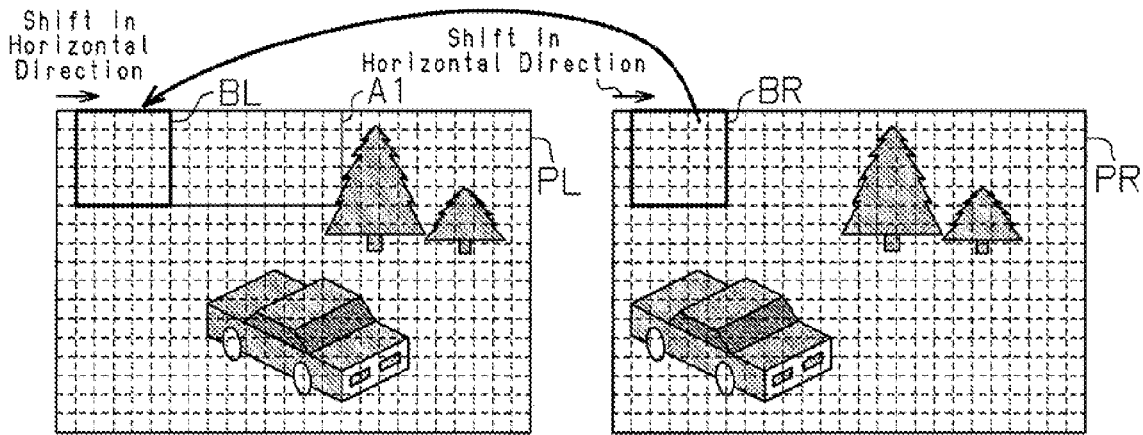
FIGS. 12A to 12C are diagrams illustrating the deviation amount calculation process.

Next, in step S2, as illustrated in FIG. 12A, the cut block BR is cut from the position horizontally shifted by one pixel. Subsequently, based on coordinates (0, 1) of the upper left pixel, the compared block BL is cut from the left-eye image PL (step S3). Then, the SAD is calculated based on the cut block BR and the compared block BL (step S4), and the value of SAD is stored in the embedded memory 55a of the comparator 55 and the embedded memory 56a of the operation control unit 56 (steps S5 and S6).

Thereafter, in the same manner as described above with reference to FIGS. 11A to 11C, the process in step S3 to S9 is repeated until movement of the compared block BL in the processing area A1 is finished. Then, when movement of the compared block BL in the processing area A1 is finished (YES in step S7), the amount of deviation is calculated (step S11), and the minimum point(s) of the SAD is extracted (step S12).

After that, similarly, the deviation amount calculation process of the cut block BR corresponding to respective pixels in the first row is performed. That is, the process in steps S2 to S19 is repeated.

Figure 12B:
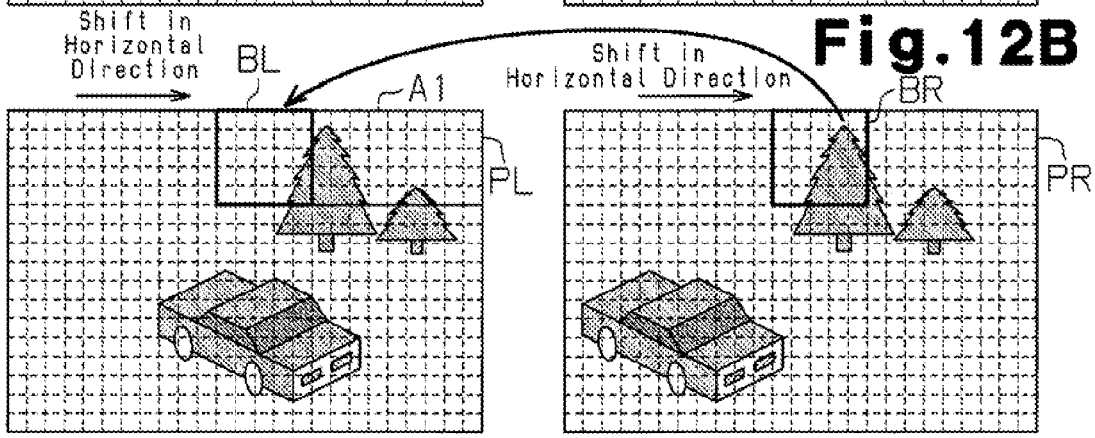

Here, as illustrated in FIG. 12B, the deviation amount calculation process in the case where coordinates of the upper left pixel of the cut block BR are set to coordinates (0, 11) will be described. This cut block BR includes the subject (tree).

First, as illustrated in FIG. 12B, the compared block BL is cut from the left-eye image PL at the coordinates (0, 11) of the upper left pixel (step S3). Subsequently, the SAD is calculated based on the cut block BR and the compared block BL (step S4), and the value of SAD is stored in the embedded memories 55a and 56a (steps S5 and S6).

Next, the compared block BL is cut from the position horizontally moved by one pixel in the processing area A1. Then, the SAD is calculated based on the compared block BL and the cut block BR, and the value of SAD is stored in the embedded memories 55a and 56a (steps S5 and S6).

Figure 12C:
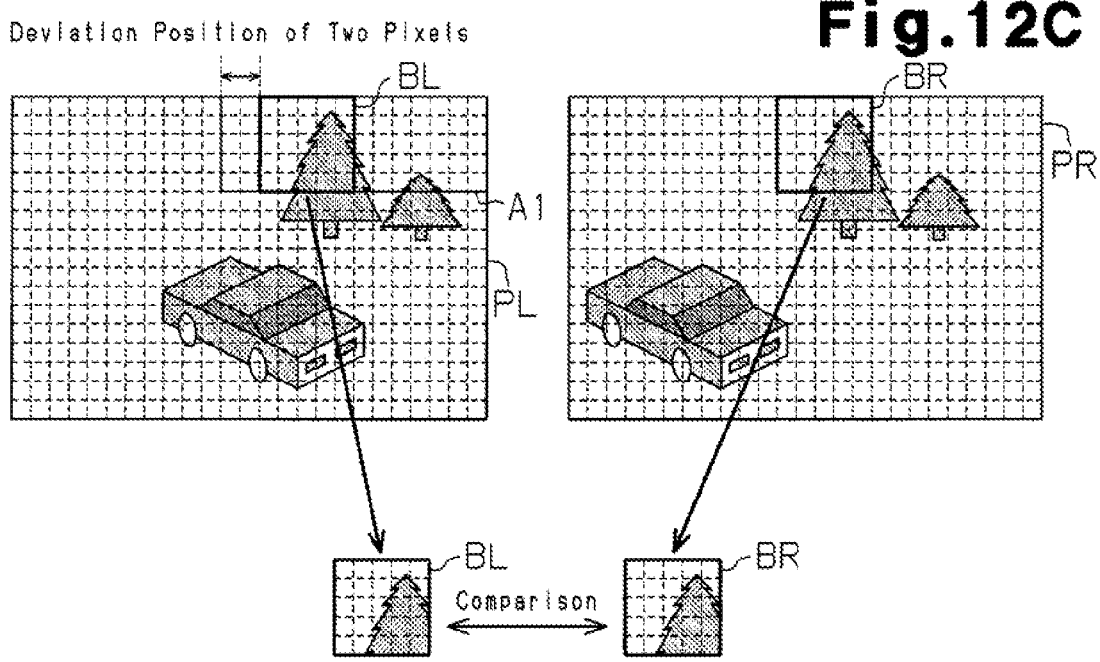
Figure 13A:
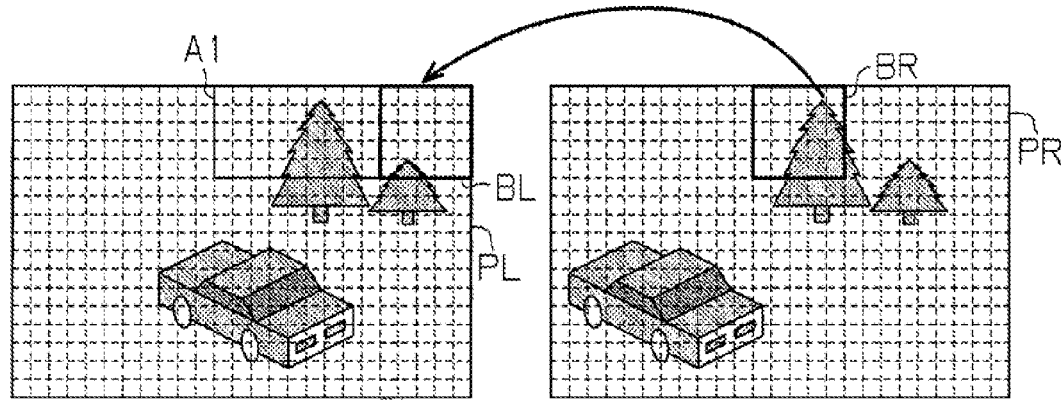
FIGS. 13A to 13C are diagrams illustrating the deviation amount calculation process.

Subsequently, as illustrated in FIG. 12C, the compared block BL is cut from the position horizontally moved by one pixel in the processing area A1. At this time, as illustrated in lower view of FIG. 12C, the image in the cut block BR substantially matches the image in the compared block BL. In other words, the compared block BL is remarkably similar to the cut block BR. Accordingly, this compared block BL has the highest correlation with the cut block BR. In such case, the value of SAD obtained by comparing the cut block BR with the compared block BL becomes close to 0 (zero). That is, the value of SAD is the smallest value. Thus, the deviation position of the compared block BL relative to the cut block BR at this time, that is, the moving distance of the compared block BL from the starting point (upper left pixel) of the processing area A1, is obtained as the amount of deviation between the right-eye image PR and the left-eye image PL. In the example of FIG. 12C, the amount of deviation is two pixels. As illustrated in FIG. 13A, the smallest value of SAD is actually calculated after movement of the compared block BL in the processing area A1 is finished.

Figure 13B:
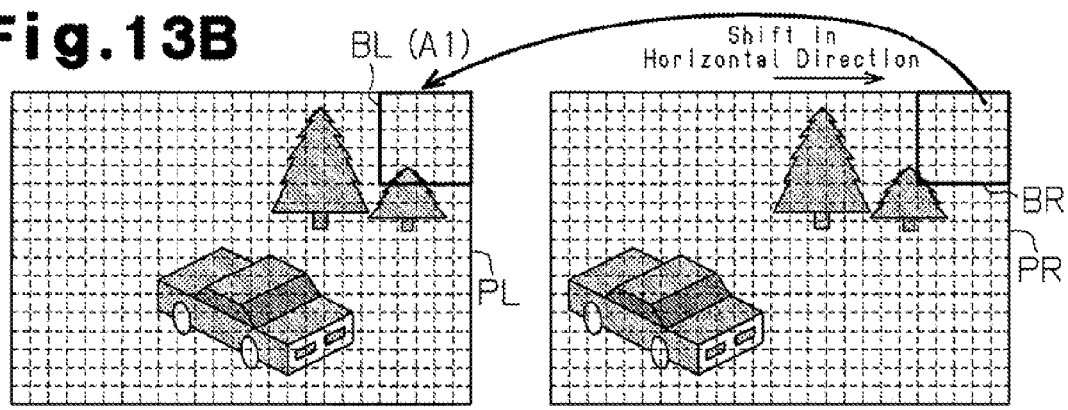
Figure 13C:
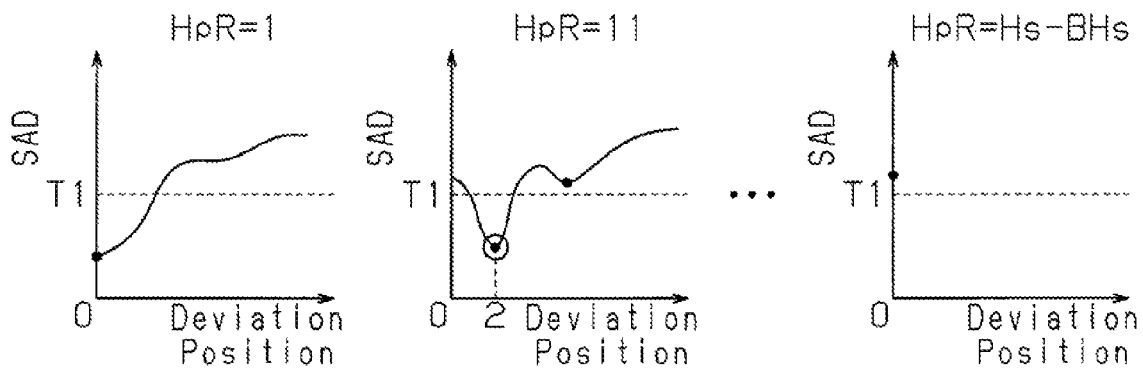

Similarly, the process in steps S2 to S19 is repeated until horizontal movement of the cut block BR in the right-eye image PR is finished. Then, as illustrated in FIG. 13B, when the amount of deviation and the minimum point(s) of the SAD are extracted at the position of the cut block BR moved to the terminal point of the right-eye image PR, it is determined that horizontal movement of the cut block BR in the right-eye image PR is finished (YES in step S13). In this manner, the cut block BR is horizontally shifted one by one pixel in the right-eye image PR, and the amount of deviation is calculated at the position of each cut block BR corresponding to respective pixels in the first row. Further, as illustrated in FIG. 13C, the minimum point(s) of the SAD is extracted at the position of each cut block BR corresponding to respective pixels in the first row (refer to a circle in FIG. 13C).

Next, in step S20 illustrated in FIG. 8, the memory control unit 53 determines whether or not vertical movement of the cut block BR in the right-eye image PR is finished. Here, when the vertical position Vp of the upper left pixel of the cut block BR matches a value obtained by subtracting the vertical block size BVs of the cut block BR from the vertical size Vs of the right-eye image PR, vertical movement of the cut block BR is finished. When vertical movement of the cut block BR is not finished (NO in step S20), the process proceeds to step S21.

Subsequently, based on calculation results (the amount of deviation) obtained at the whole horizontal area of the last vertical position Vp (here, Vp=j), that is, the position of each cut block BR corresponding to respective pixels in the first row, a next vertical position Vp of the cut block BR is determined. In this embodiment, in step S21, the operation control unit 56 determines whether or not the amount of deviation is 0 at all positions of the cut block BR at the last vertical position Vp. Here, as described above with reference to FIG. 12C, the cut block BR having the amount of deviation of 2 exists (No in step S21). In this case, in step S22, a value "1" is added to the vertical position Vp of the upper left pixel of the cut block BR.

Figure 15A:
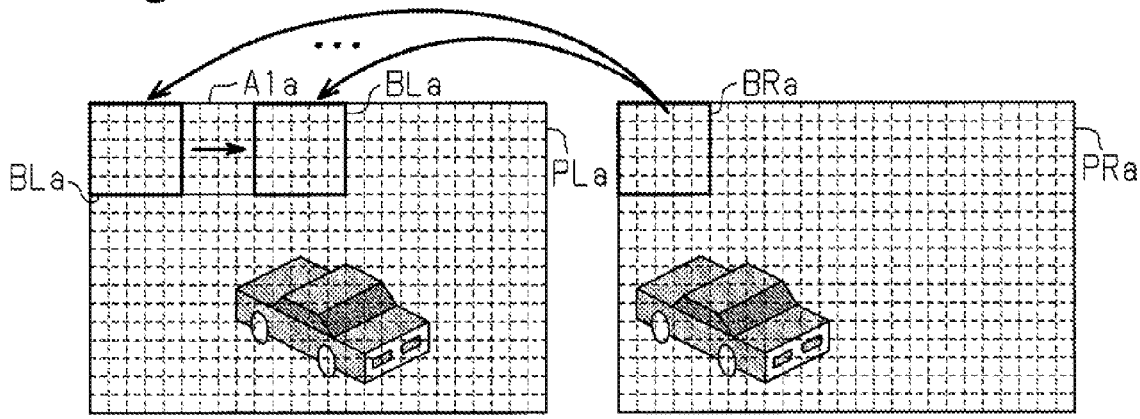
FIGS. 15A to 15D are diagrams illustrating the deviation amount calculation process.
Figure 15B:
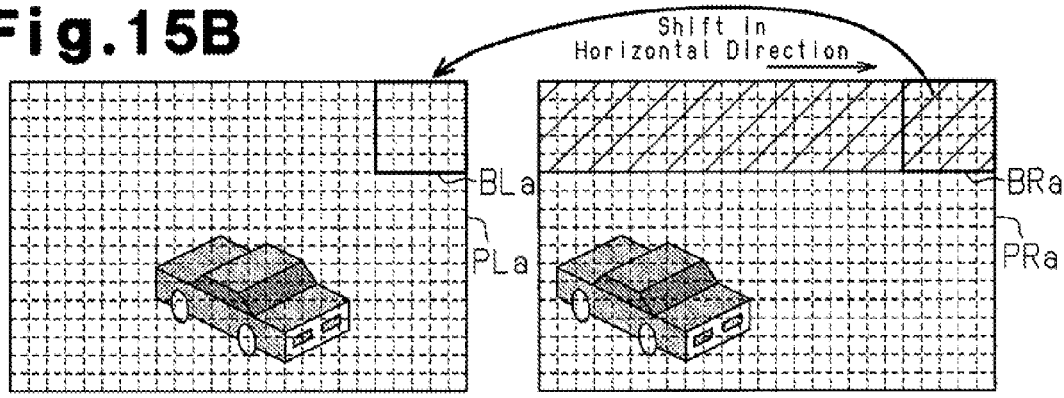
Figure 15C:
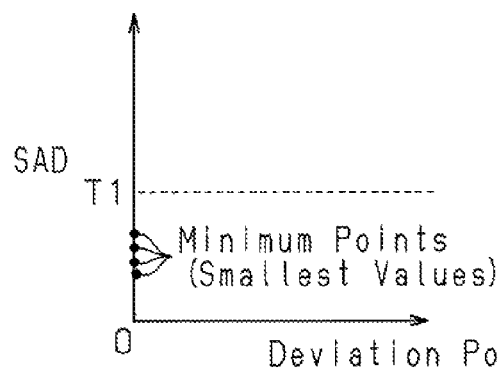
Figure 15D:
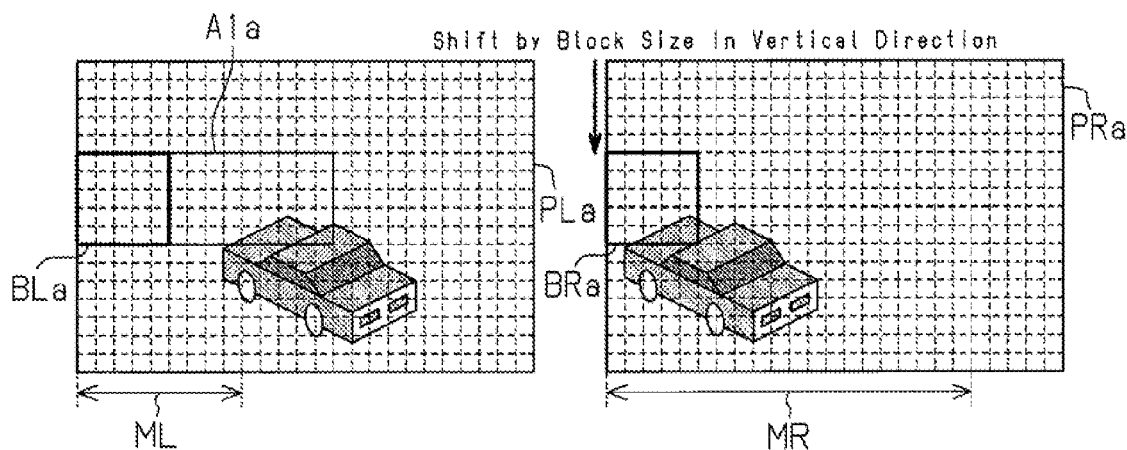

In step S21, when the amount of deviation at all positions of the cut block BR at the last vertical position Vp (Vp=0) is 0 (YES in step S21), the operation control unit 56 adds the vertical block size BVs of the cut block BR to the vertical position Vp of the upper left pixel of the cut block BR (step S23). For example, the right-eye image PRa illustrated in FIG. 15A and FIG. 15B includes no subject with parallax in the whole horizontal area (block range) where the cut block BRa moves in the first row. Similarly, the left-eye image PLa includes no subject with parallax in the whole horizontal area of the processing area A1a where the compared block BLa moves in the first row. In this case, as illustrated in FIG. 15C, it is highly likely that the amount of deviation becomes 0 (zero) at the position of each cut block BR in the whole horizontal area in the M-th row (the first row in FIGS. 15A and 15B). In other words, in the case where the amount of deviation is 0 (zero) at all positions of the cut block BR in the M-th row, there is highly likely that the block range (hatched area in FIG. 15B) in which the cut block BR moves includes no subject with parallax. For this reason, it may be determined that the deviation amount calculation process of pixels in the block range is not required. Thus, as illustrated in FIG. 15D, the vertical position Vp of the upper left pixel of the cut block BRa is shifted by the vertical block size BVs, and the deviation amount calculation process of pixels in the block range is skipped. When the vertical position Vp is shifted by the vertical block size BVs in this manner, the moving region MR of the cut block BRa is set to the whole horizontal area of the right-eye image PR, and the moving limit ML of the compared block BLa is set to the whole horizontal processing area A1. After that, the process in steps S24 and S25 described below are skipped and the process proceeds to step S26 (not illustrated in FIG. 8).

Next, based on the past calculation results (the amount of deviation and the minimum points), the moving limit ML of the compared block BL in the processing area A1 and the horizontal moving region MR of the cut block BR in the right-eye image PR are set. First, in step S24, in the deviation amount calculation process at the last vertical position Vp (here, Vp=0), it is determined whether or not one or more minimum points that are lower than the determination level T1 are extracted. In this embodiment, as illustrated in FIGS. 11D and 13C, since one or more minimum points that are lower than the determination level T1 are extracted (YES in step S24), the process proceeds to step S25.

Subsequently, in step S25, on the basis of the calculation results (minimum points) calculated at the last vertical position Vp (N-th row), the operation control unit 56 narrows the moving limit ML and the moving region MR in performing the deviation amount calculation process of pixels at a next vertical position ((N+1)-th row). This is due to that, with the same subject (here, tree), when the vertical position moves, the amount of deviation in the horizontal direction hardly changes. That is, with the same subject, it is deemed that the smallest value of SAD of the pixels in the (N+1)-th row appears in the vicinity of the minimum points (deviation position) extracted in the deviation amount calculation process of the N-th row. A method of setting the moving limit ML and the moving region MR will be described below in detail.

Figure 14A:
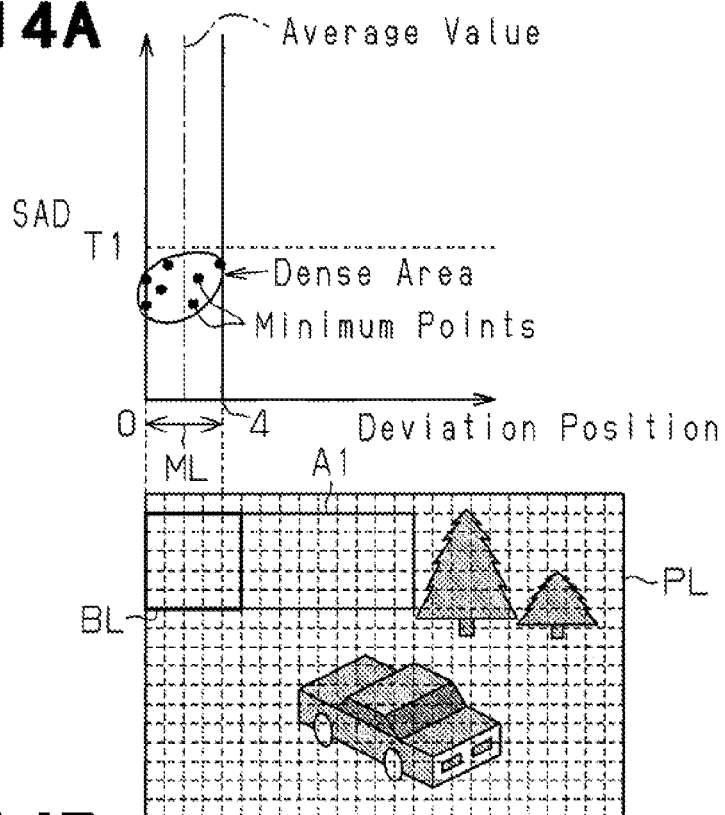
FIGS. 14A to 14C are diagrams illustrating the deviation amount calculation process.

First, as illustrated in FIG. 14A, the operation control unit 56 plots the minimum points of the SAD, which are extracted in the deviation amount calculation process of each cut block BR at the last vertical position Vp (Vp=0), on a graph representing the deviation position as a horizontal axis. Based on the graph (deviation position of the minimum points), the operation control unit 56 sets the moving limit ML of the compared block BL at the next vertical position Vp (here, Vp=1).

The operation control unit 56 extracts the dense area (refer to circles) of the minimum points plotted on the graph. Subsequently, the operation control unit 56 sets the moving limit ML of the compared block BL on the basis of the deviation position at the minimum points in the extracted dense area.

For example, the operation control unit 56 calculates an average value of the deviation position in accordance with the minimum points in the dense area. For example, in the dense area, in the case where one minimum point having the deviation position of 0 pixel, one minimum point having the deviation position of one pixel, one minimum point having the deviation position of two pixels, one minimum point having the deviation position of three pixels, and one minimum point having the deviation position of four pixels exists, the average value of the deviation position becomes (0+1+2+3+4)/5=2 pixels. Next, the operation control unit 56 sets an area, which includes X pixels before and after the average value of the deviation position, to the moving limit ML of the compared block BL. Here, for example, the value of X is set to be smaller as variation in the minimum points (deviation position) in the dense area is smaller. That is, as the variation in the minimum points is smaller, the moving limit ML of the compared block BL is set to be smaller. At this time, it is preferred that the moving limit ML of the compared block BL is set so as to include all of the minimum points in the dense area. In FIG. 14A, in the processing area A1, the pixel area corresponding to the deviation position of 0 to 4 pixels is set to the moving limit ML of the compared block BL.

A standard for determining whether or not an area is the dense area may be appropriately set. For example, an area where Z (Z is an integer of 1 or larger) minimum points exist in the range of the deviation position of Y (Y is an integer of 1 or larger) pixels may be determined as the dense area. For example, when the value of Y is three and the value of Z is four, an area where four or more minimum point exist in the range of three pixels corresponding to the range of the deviation position of k to k+2 (for example, 0 to 2 pixels) is determined as the dense area. The value of Y and the value of Z are appropriately set in accordance with size of image, size of the cut block BR and size of the processing area A1.

Figure 14B:
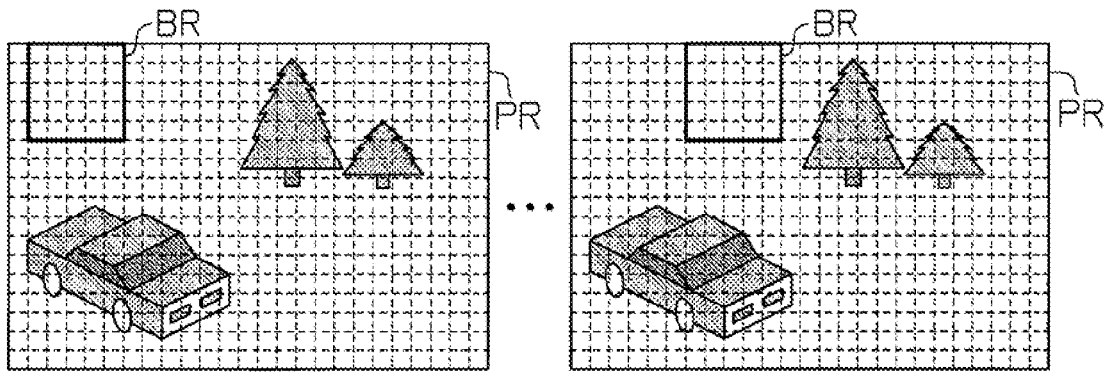
Figure 14C:
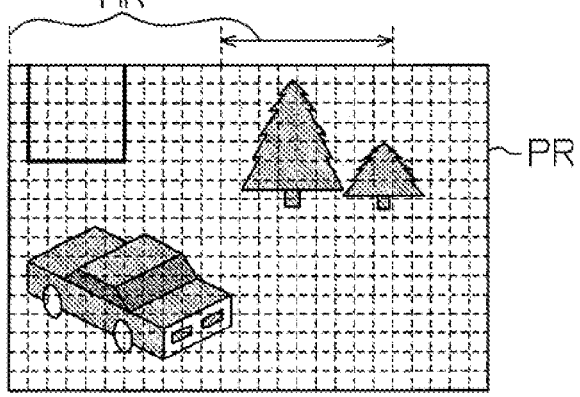

In step S25, based on the graph, the horizontal moving region MR of the cut block BR at the next vertical position Vp is set. First, the operation control unit 56 determines the minimum points having the deviation position near 0 pixel, and extracts the cut block BR corresponding to the minimum points. In this example, as illustrated in FIG. 14B, six cut blocks BR having the horizontal position HpR of 1 to 6 are extracted as those having the deviation position of 0 pixels. Next, the operation control unit 56 determines a horizontal area (area in the row direction) corresponding to the range of the extracted cut block BR, excludes the horizontal area from the moving region MR. That is, the operation control unit 56 sets the moving region MR such that the cut block BR is not cut from the determined horizontal area in the deviation amount calculation process at the next vertical position Vp (Vp=1). In this example, as illustrated in FIG. 14C, the pixel area having the horizontal position HpR of 1 to 10 is excluded from the moving region MR. In other words, the moving region MR is set to areas having the horizontal position HpR of 0 and 11 to (Hs—BHs). The deviation position of 0 pixels at the minimum points means no binocular parallax, and it is highly likely that the subject is an image at the position remote from the imaging device 1. For this reason, the moving region MR is narrowed.

In this manner, in this embodiment, in step S25 illustrated in FIG. 8, the moving limit ML of the compared block BL is set to partial area, and the moving region MR of the cut block BR is set to partial area.

Next, it is determined whether the moving region MR of the cut block BR is set to the whole area or the partial area (step S26). Here, the moving region MR of the cut block BR is set to the partial area (NO in step S26). Thus, the horizontal position HpR of the upper left pixel of the cut block BR is set to the first horizontal position (in this example, 0) in the moving region MR (step S27). In step S26, when the moving region MR of the cut block BR is set to the whole area (YES in step S26), the horizontal position HpR of the upper left pixel of the cut block BR is set to 0 at all times (step S28).

Subsequently, it is determined whether the moving limit ML of the compared block BL is set to the whole area or the partial area (step S29). Here, the moving limit ML of the compared block BL is set to the partial area (NO in step S29). Thus, the horizontal position HpL of the upper left pixel of the compared block BL is set to the horizontal position (in this example, 0) corresponding to the first deviation position in the moving limit ML set in the processing area A1 (step S30). In step S29, when the moving limit ML of the compared block BL is set to the whole area (YES in step S29), the horizontal position HpL of the upper left pixel of the compared block BL is set to 0 at all times (step S31). After the process in steps S30 and S31, the deviation amount calculation process of pixels at the vertical position Vp=1 is started in step S2.

Figure 16A:
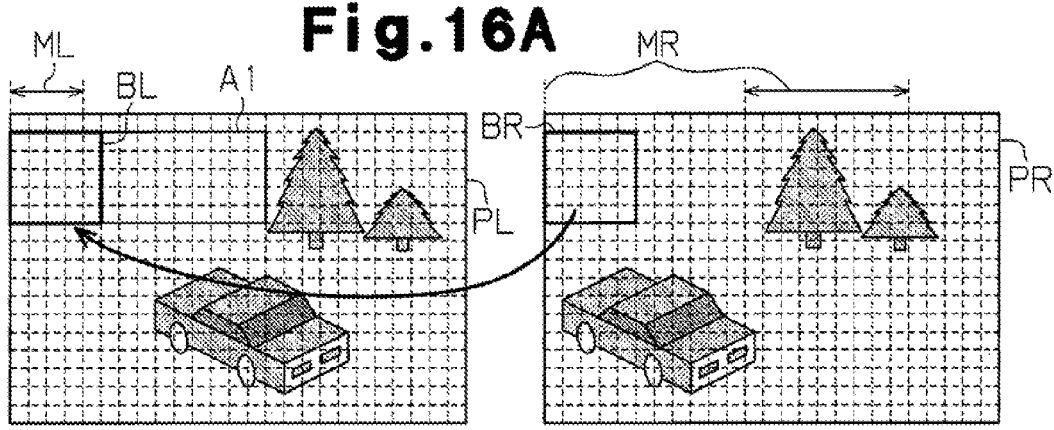
FIGS. 16A to 16D are diagrams illustrating the deviation amount calculation process.

Next, in step S2, as illustrated in FIG. 16A, based on the coordinates (1, 0) of the upper left pixel, the cut block BR is cut from the right-eye image PR. Subsequently, based on the coordinates (1, 0) of the upper left pixel, the compared block BL is cut from the left-eye image PL (step S3). Then, the SAD is calculated based on the cut block BR and the compared block BL (step S4), and the value of SAD is stored in the embedded memories 55a and 56a (steps S5 and S6).

Next, since movement of the compared block BL in the processing area A1 is not finished (NO in step S7) and the moving limit ML of the compared block BL is set to the partial area (NO in step S8), the process proceeds to step S10. In step S10, the horizontal position HpL of the upper left pixel of the compared block BL is set to the next horizontal position (here, 1) of the moving limit ML, which is set in step S25. At this time, in the case where the address of the horizontal position HpL is skipped (for example, skip from 0 to 5), the operation control unit 56 provides the memory control unit 53 with the skip signal SS. The skip signal SS includes the skip pulse, which instructs skip, and the skip address, which indicates the address of the memory 51 at which the pixel at the horizontal position after skipping is stored.

Figure 16B:
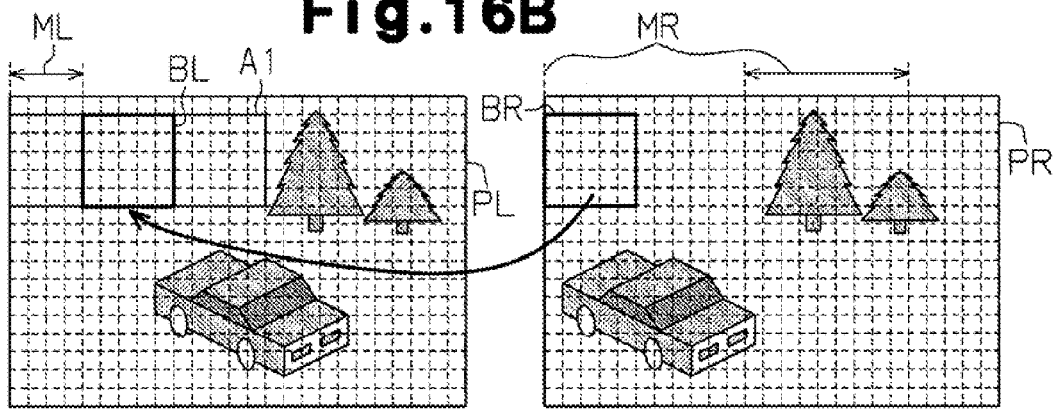

Thereafter, the process in steps S3 to S10 is repeated until movement of the compared block BL in the moving limit ML of the processing area A1 is finished. Then, as illustrated in FIG. 16B, when the value of SAD obtained by comparing the cut block BR with the compared block BL cut at the position of coordinates (1, 4) is stored in the embedded memories 55a and 56a, the process proceeds to step S10. In step S10, when no next horizontal position of the moving limit ML exists, that is, movement of the compared block BL in the moving limit ML is finished, the process proceeds to step S11. Subsequently, in step S11, the amount of deviation is calculated at the position of the current cut block BR (FIG. 16B) and in step S12, the minimum point(s) of the SAD, which is lower than the determination level T1, is extracted. Here, the amount of deviation and the minimum point(s) are extracted based on the four values of SAD calculated by comparison operation with the compared block BL extracted at the deviation position (moving distance) of 0 to 4 pixels.

In this manner, in the deviation amount calculation process at the vertical position Vp=1, cutting of the compared block BL from an area other than the moving limit ML in the processing area A1 (in this example, an area of deviation position of 5 or more) is omitted so as to omit calculation of the SAD.

Next, since horizontal movement of the cut block BR in the right-eye image PR is not finished (NO in step S13) and the moving region MR of the cut block BR is set to partial area (NO in step S14), the process proceeds to step S17. In step S17, the horizontal position HpR of the upper left pixel of the cut block BR is set to the next horizontal position of the moving region MR, which is set in step S25. In this example, as illustrated in FIG. 16B, since the horizontal position=1 to the horizontal position=10 in the right-eye image PR is excluded from the moving region MR, the horizontal position HpR of the upper left pixel of the cut block BR is set to 11. At this time, in order to skip the horizontal position HpR from 0 to 11, the skip signal SS is supplied from the operation control unit 56 to the memory control unit 53.

Next, since the moving limit ML of the compared block BL is set to partial area (NO in step S19), the horizontal position HpL of the upper left pixel of the compared block BL is set to the horizontal position corresponding to the first deviation position (here, 0 pixel) in the moving limit ML set in the processing area A1 in step S25 (step S19). In this example, the horizontal position HpL of the upper left pixel of the compared block BL is set to 11. After that, the process returns to step S2.

Figure 16C:
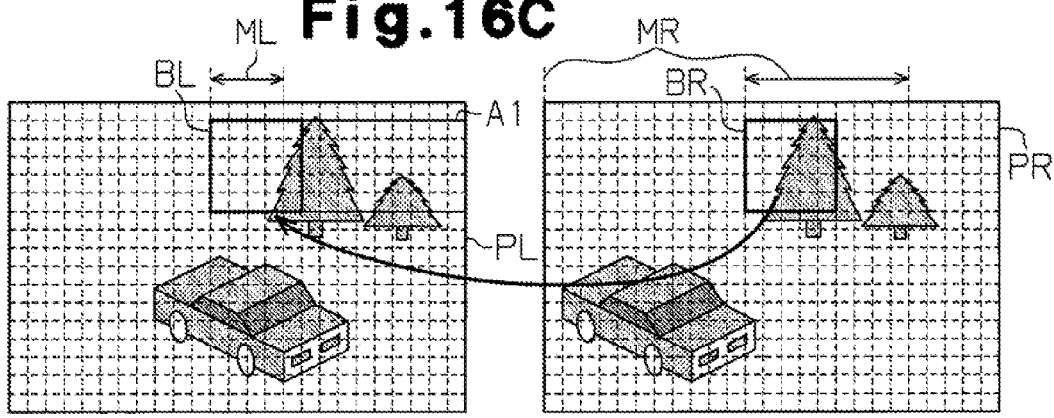

Next, as illustrated in FIG. 16C, the cut block BR is cut from the right-eye image PR based on the coordinates (1, 11) of the upper left pixel, and the compared block BL is cut from the left-eye image PL based on the coordinates (1, 11) of the upper left pixel. Subsequently, the SAD is calculated based on comparison of the cut block BR and the compared block BL (step S4), and the value of SAD is stored in the embedded memories 55a and 56a (steps S5 and S6).

Next, the compared block BL is cut from the position horizontally moved by one pixel in the moving limit ML set in the processing area A1. Subsequently, the SAD is calculated based on comparison of the compared block BL and the cut block BR, and the value of SAD is stored in the embedded memories 55a and 56a (steps S5 and S6).

Figure 16D:
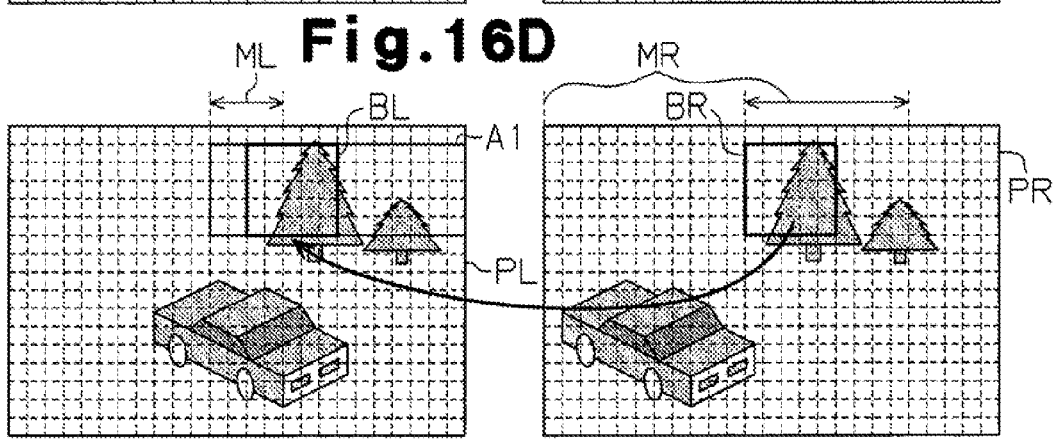

After that, as illustrated in FIG. 16D, the compared block BL is cut from the position horizontally moved by one pixel in the moving limit ML set in the processing area A1. Here, comparing the compared block BL with the cut block BR, as illustrated in FIG. 16D, the image in the cut block BR substantially matches the image in the compared block BL. That is, the compared block BL is remarkably similar to the cut block BR. Accordingly, this compared block BL has the highest correlation with the cut block BR. Therefore, the value of SAD obtained by comparing the cut block BR with the compared block BL becomes close to 0. That is, the value of SAD is the smallest value. Thus, the moving distance of the compared block BL from the starting point (upper left pixel) of the processing area A1 at this time is obtained as the amount of deviation at the position of the current cut block BR. In the example of FIG. 16D, the amount of deviation is two pixels. After that, the process in steps S3 to S10 is repeated until movement in the moving limit ML of the compared block BL is finished.

Similarly, the process in steps S2 to S19 is repeatedly executed until horizontal movement of the cut block BR in the moving region MR is finished. Thereby, each cut block BR cut from the moving region MR is compared with the compared block BL cut from the moving limit ML to calculate the amount of deviation and the minimum point(s) of the SAD at the position of each cut block BR. Here, in processing at the vertical position Vp=1, any subject other than the subject (tree) appearing at the vertical position Vp=0 does not appear. Thus, as illustrated in FIG. 17, the calculation result (minimum points) in the whole horizontal area at the vertical position Vp=1 is substantially similar to that at the vertical position Vp=0. Therefore, even when the moving limit ML of the compared block BL is narrowed on the basis of the calculation result at the previous vertical position Vp=0, an area (compared block BL) highly correlated with the cut block BR may be preferably searched in the narrowed moving limit ML. This may accurately and efficiently calculate the amount of deviation at the position of each cut block BR.

Next, since the cut block BR having the amount of deviation of one or more pixels exists (NO in step S21 in FIG. 8), a value "1" is added to the vertical position Vp of the upper left pixel of the cut block BR (Vp=1+1) in step S22. Subsequently, as illustrated in FIG. 17, since one or more minimum points that are lower than the determination level T1 are extracted (YES in step S24), the process proceeds to step S25. In step S25, the moving limit ML of the compared block BL is reset based on the minimum points extracted in the deviation amount calculation process at the last vertical position Vp=1. For example, as illustrated in FIG. 17, when the average value of the deviation position of the minimum points at the vertical position Vp=1 is deviated from the average value of the deviation position of the minimum points at the vertical position Vp=0, the moving limit ML of the compared block BL is changed according to the deviation of the average value. In this example, in the calculation result at the vertical position Vp=1, variation in the deviation position of the minimum points in the dense area becomes larger. Thus, the moving limit ML of the compared block BL at the next vertical position Vp=2 is changed from the pixel area corresponding to the deviation position of 0 to 4 pixels to the pixel area corresponding to the deviation position of 0 to 5 pixels.

Here, it is assumed that, as illustrated in FIG. 18A, three dense areas exist according to the calculation result at the vertical position Vp=N−1, and the three moving limits ML are set. Further, it is assumed that, as illustrated in FIG. 18B, according to the calculation result at the vertical position Vp=N, all values of the SAD calculated in one of the three moving limits ML (for example, moving limit ML1) are the determination level T1 or higher. In this case, at the next vertical position Vp=N+1, the moving limit ML1 of the compared block BL is excluded. That is, in the deviation amount calculation process at the next vertical position Vp=N+1, cutting of the compared block BL and calculation of the SAD are not performed in the moving limit ML1.

Thereafter, similarly, after the moving limit ML and the moving region MR are set by using the calculation result at the last vertical position, the deviation amount calculation process is performed.

Figure 19A:
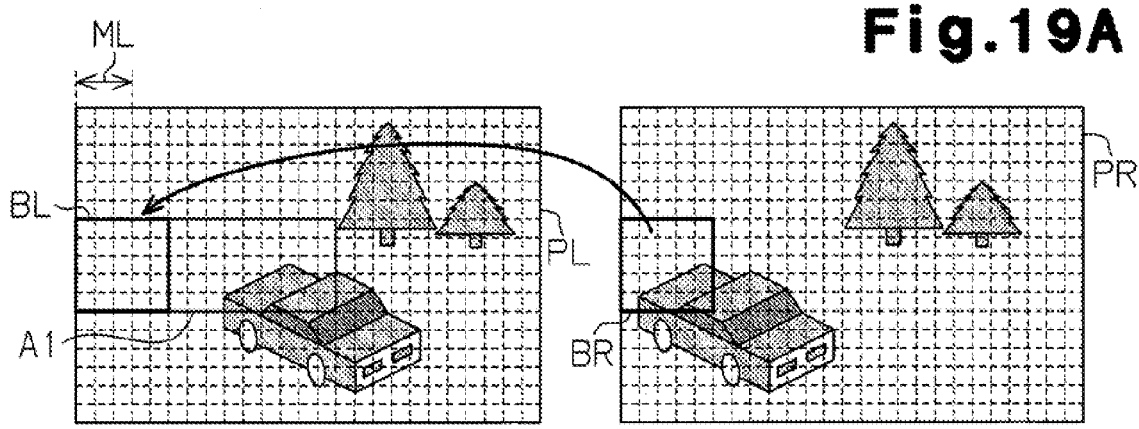
FIGS. 19A to 19D are diagrams illustrating the deviation amount calculation process.

Next, as illustrated in FIG. 19A, the case where a subject (here, vehicle) that is different from a subject (here, tree) appearing at the last vertical position appears will be described. Here, the case where the vertical position Vp of the upper left pixel of each of the cut block BR and the compared block BL is 6 is used as an example. In this case, the moving limit ML and the moving region MR are set based on the calculation result at the last vertical position Vp=5. Here, the moving limit ML is set to an area having the deviation position of 0 to 3 pixels, and the moving region MR is set to the whole horizontal area. Then, the process in steps S2 to S19 is performed as described above.

Figure 19B:
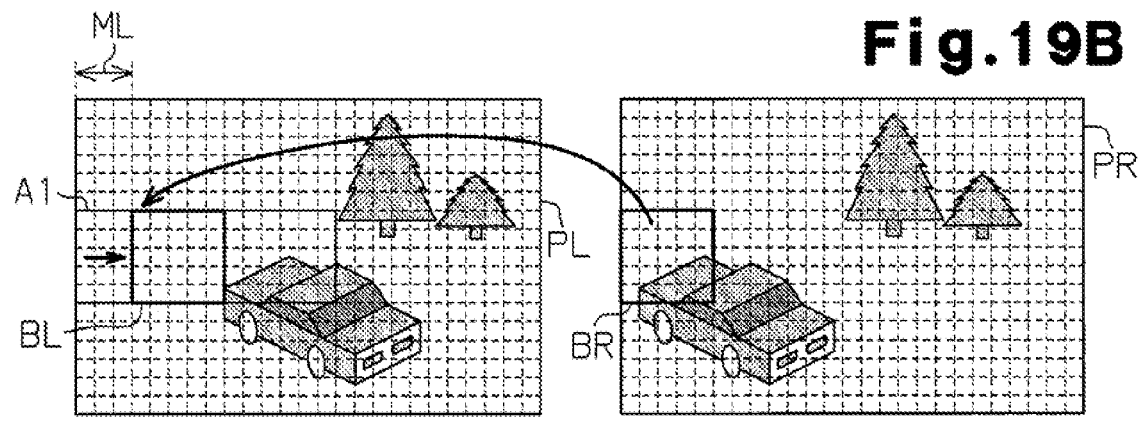
Figure 19C:
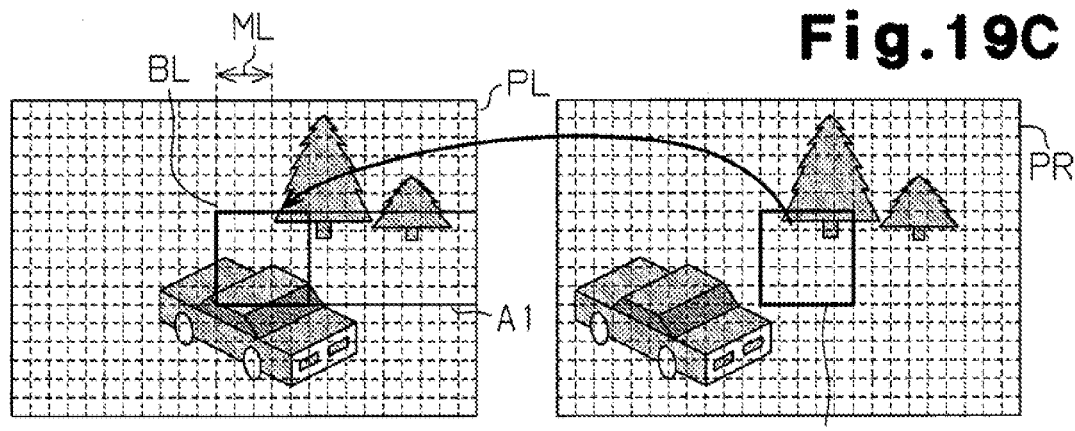

First, as illustrated in FIG. 19A, the cut block BR and the compared block BL are cut based on coordinates (6, 0) of the upper left pixel, and the SAD is calculated (steps S2 to S4). Subsequently, as illustrated in FIG. 19B, the compared block BL is sequentially cut in the moving limit ML in the processing area A1, that is, at positions of the coordinates (6, 0) to (6, 3) to sequentially calculate the SAD. Then, the minimum point(s) is calculated from the values of SAD. Next, as illustrated in FIG. 19C, the cut block BR is horizontally moved by one pixel in the right-eye image PR, and is compared with the compared block BL in the moving limit ML at the position of the cut block BR to calculate the minimum point(s) of the SAD. Calculation of the minimum point(s) is repeated until movement of the cut block BR in the right-eye image PR is finished (steps S2 to S19). When movement of the cut block BR in the right-eye image PR is finished, a value "1" is added to the vertical position Vp of the cut block BR and the compared block BL (steps S20 to S22).

Figure 19D:
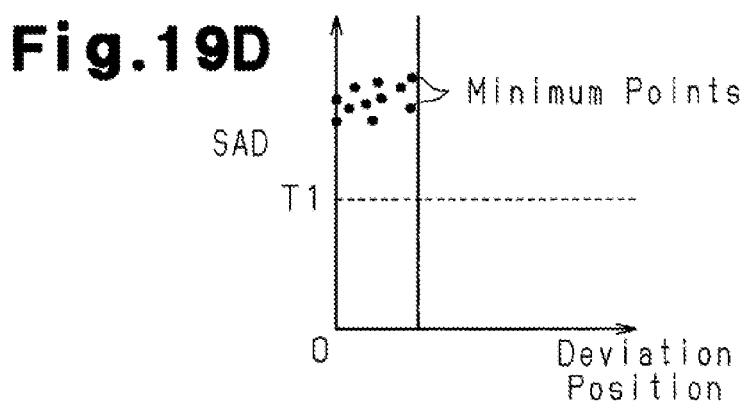

However, as illustrated in FIG. 19D, all of the minimum points (SAD) calculated in the above-mentioned deviation amount calculation process are higher than the determination level T1. This is due to that another subject (vehicle) appears in the whole horizontal area, that is, another subject (vehicle) having a parallax amount (the amount of deviation) that is different from that of the subject (tree) appearing at the last vertical position appears. Therefore, the moving limit ML fed back from the calculation result at the last vertical position may not be effectively used, resulting in that the amount of deviation may not be correctly calculated.

Figure 20A:
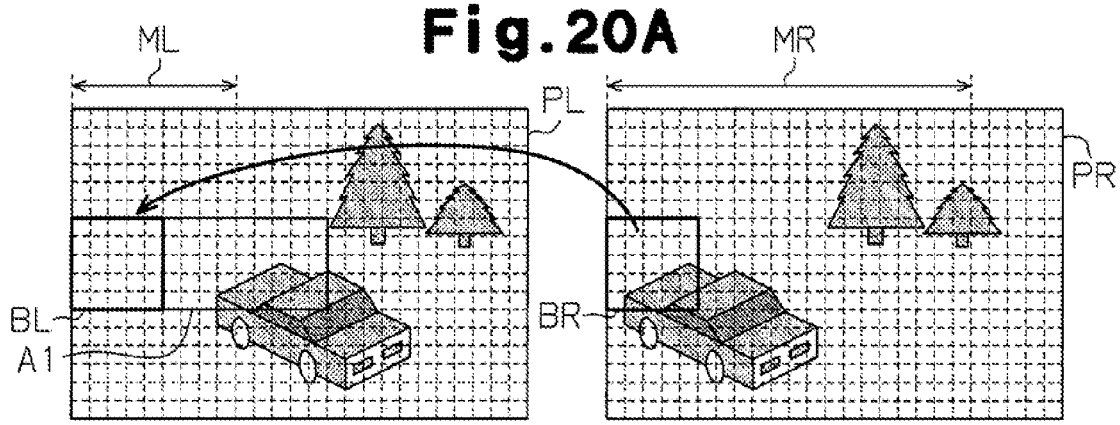
FIGS. 20A to 20D are diagrams illustrating the deviation amount calculation process.

Thus, in this embodiment, when it is determined that the amount of deviation may not be correctly calculated according to the calculation result at the previous vertical position, the moving limit ML and the moving region MR, which are set at this time, are cleared. That is, in the case where all of the calculated minimum points (SAD) exceed the determination level T1, in other words, no minimum point that is lower than the determination level T1 is extracted (NO in step S24 in FIG. 8), the process proceeds to step S32. In step S32, the operation control unit 56 subtracts a value "1" from the vertical position Vp of the upper left pixel of each of the cut block BR and the compared block BL. Here, since the vertical position Vp is 7 by adding a value "1" to the vertical position Vp (Vp=6) in step S22, the vertical position Vp is returned to 6 by subtracting a value "1" from the vertical position Vp (Vp=7). Further, in step S32, the operation control unit 56 sets the moving limit ML and the moving region MR to the whole area. After that, the horizontal position HpR of the upper left pixel of the cut block BR is set to 0 (step S28), and the horizontal position HpL of the upper left pixel of the compared block BL is set to 0 (step S31). After that, the process returns to step S2. Thereby, as illustrated in FIG. 20A, the moving limit ML and the moving region MR are set to the whole horizontal area, the deviation amount calculation process of pixels at the vertical position Vp=6 is performed again. That is, the process in steps S2 to S19 is repeated.

In this case, first, the cut block BR is cut from the right-eye image PR based on the coordinates (6, 0) of the upper left pixel (step S2). The compared block BL is cut from the left-eye image PL based on the coordinates (6, 0) of the upper left pixel (step S3). Subsequently, the SAD is calculated based on comparison of the cut block BR and the compared block BL (step S4), and the value of SAD is stored in the embedded memories 55a and 56a (steps S5 and S6).

Subsequently, the compared block BL is cut from the position horizontally moved one by one pixel in the whole of the processing area A1 (moving limit ML). Then, the SAD is calculated based on comparison of the compared block BL and the cut block BR.

Figure 20B:
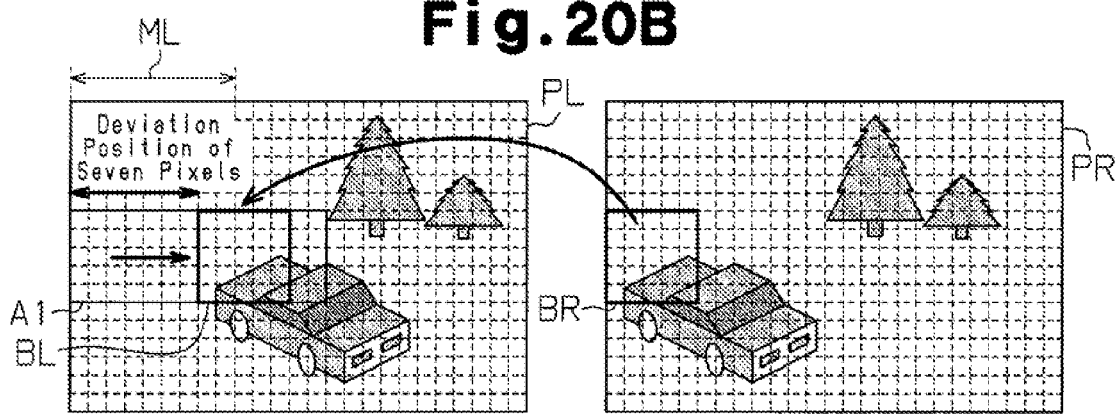

As illustrated in FIG. 20B, the compared block BL, which is cut at the position horizontally moved by seven pixels from the starting point of the processing area A1, that is, the position of coordinates (6, 7), is compared with the cut block BR. At this time, the image in the cut block BR substantially matches the image in the compared block BL. That is, the compared block BL is remarkably similar to the cut block BR. Therefore, this compared block BL is an area highly correlated with the cut block BR in the left-eye image PL. Accordingly, the amount of deviation at the position of the cut block BR, that is, the position of coordinates (6, 0), is seven pixels.

Figure 20C:
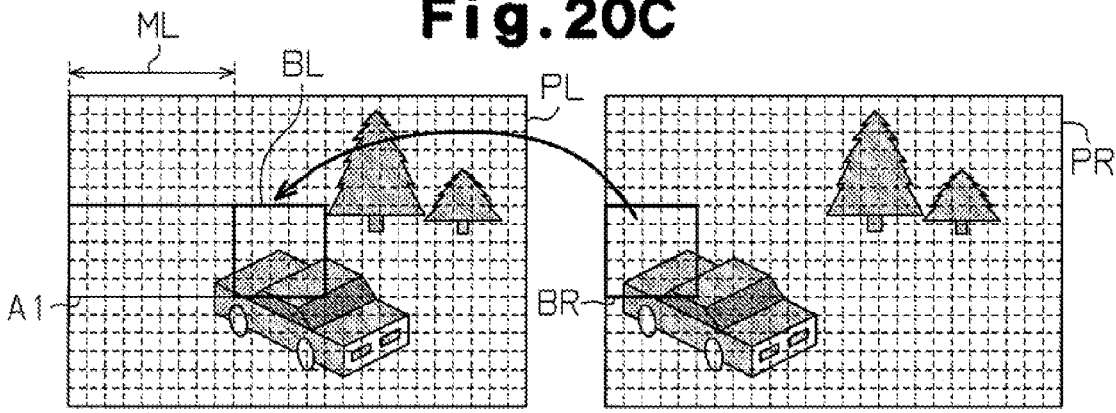
Figure 20D:
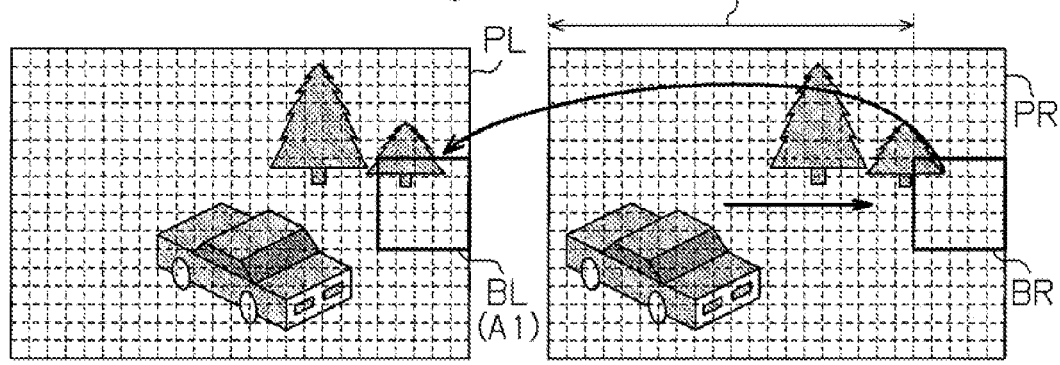
Figure 21A:
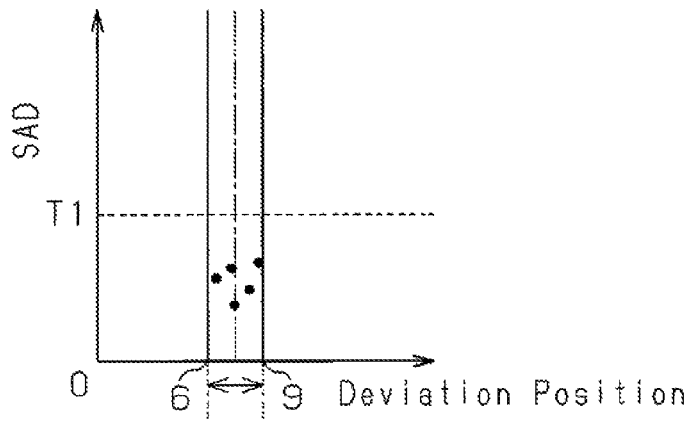
FIGS. 21A to 21C are diagrams illustrating the deviation amount calculation process.

Thereafter, as illustrated in FIG. 20C, when movement of the compared block BL in the whole of the processing area A1 is finished, the amount of deviation (in this example, seven pixels) at the position of the cut block (coordinates (6, 0)) is calculated, and the minimum points of the SAD are extracted. Next, as illustrated in FIG. 20D, the cut block BR is cut while being horizontally moved one by one pixel in the whole region of the right-eye image PR (moving region MR). Then, the amount of deviation and the minimum points of the SAD are extracted at the position of each cut block BR. The calculation result (minimum points) in the whole horizontal area at the vertical position Vp=6, as illustrated in FIG. 21A, are dense in the region having a large deviation position. This is due to that the amount of parallax (the amount of deviation) of the subject (vehicle) included in the cut block BR at the vertical position Vp=6 is large.

Figure 21B:
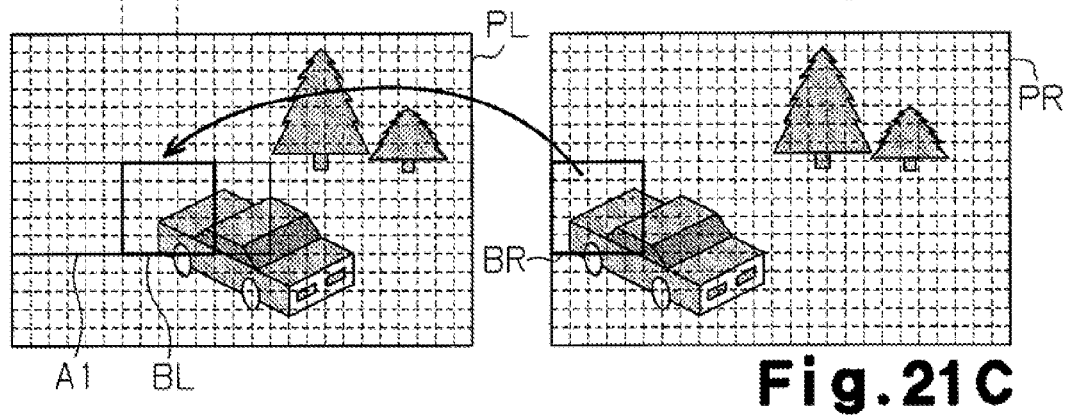

After that, in step S21 in FIG. 8, it is determined that the cut block BR having the amount of deviation of 1 or more exists (NO in step S21). Thus, a value "1" is added to the vertical position Vp of the upper left pixel of the cut block BR (step S22). Subsequently, one or more minimum points that are lower than the determination level T1 are extracted in the deviation amount calculation process at the last vertical position Vp=6 (YES in step S24). Thus, the moving limit ML of the compared block BL and the moving region MR of the cut block BR are reset based on the minimum points at the last vertical position Vp=6. That is, in this example, as illustrated in FIGS. 21A and 21B, the moving limit ML of the compared block BL in the deviation amount calculation process at the next vertical position Vp=7 is set to a pixel area corresponding to the deviation position of 6 to 10 pixels.

Figure 21C:
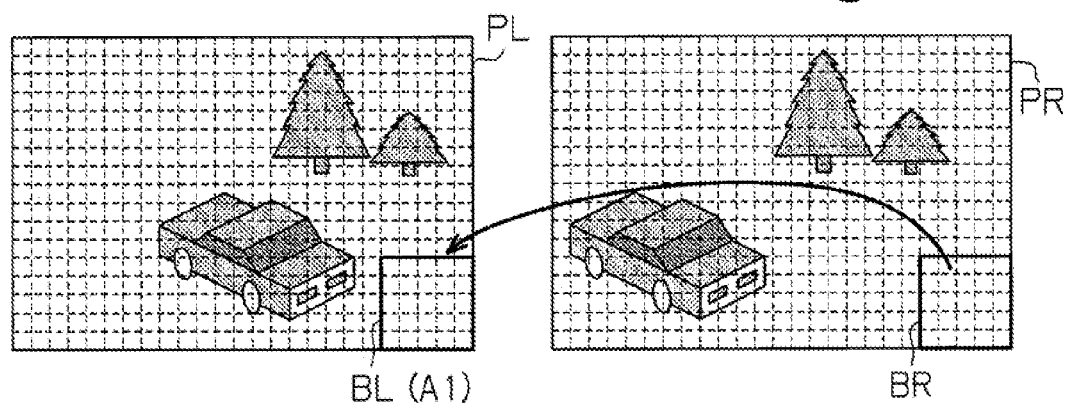
Figure 22A:
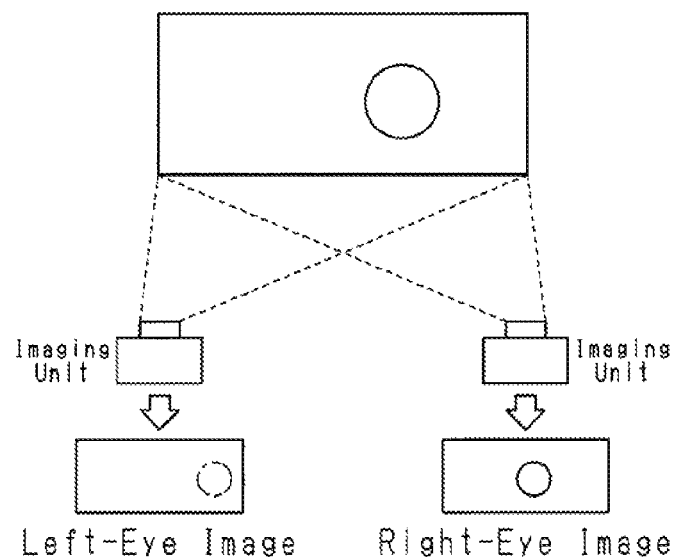
FIGS. 22A to 22C are diagrams illustrating the amount of deviation between the right-eye image and the left-eye image.
Figure 22B:
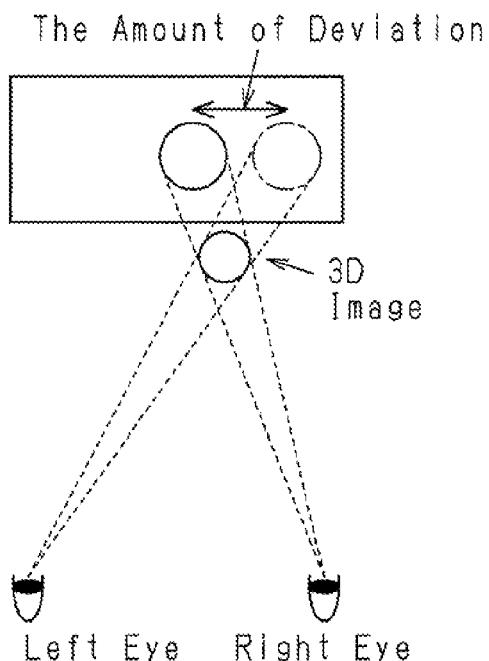
Figure 22C:
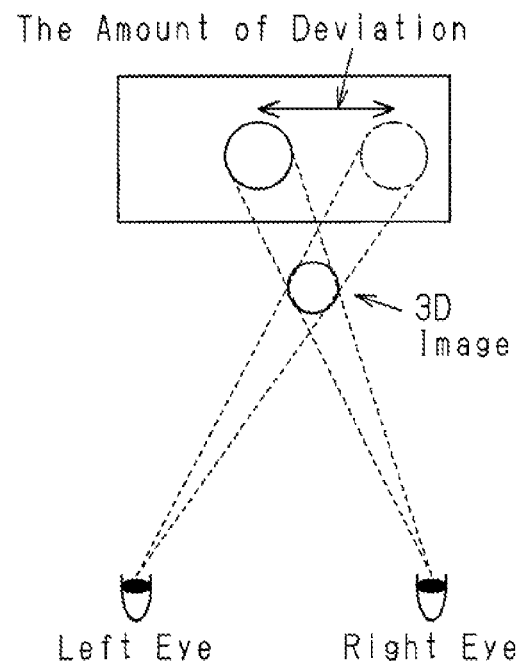
Figure 23A:
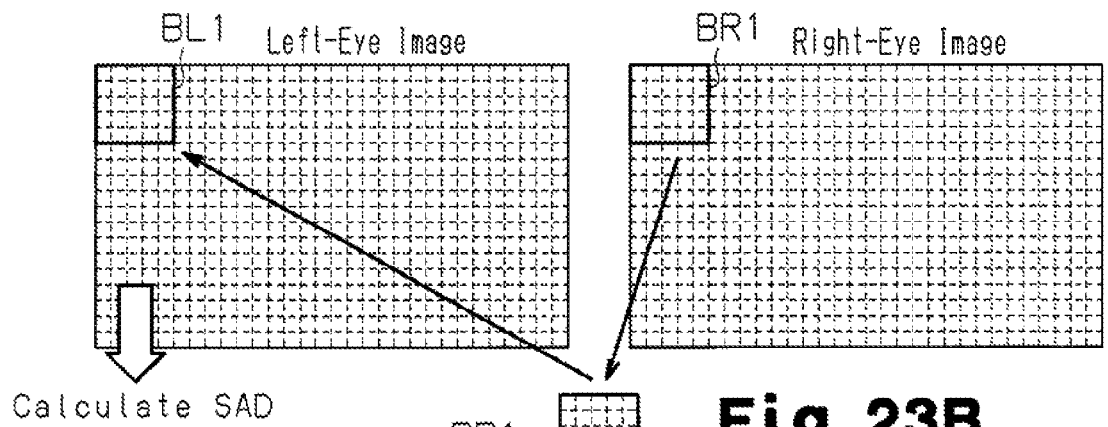
FIGS. 23A to 23C are diagrams illustrating deviation amount calculation process in the related art.
Figure 23B:
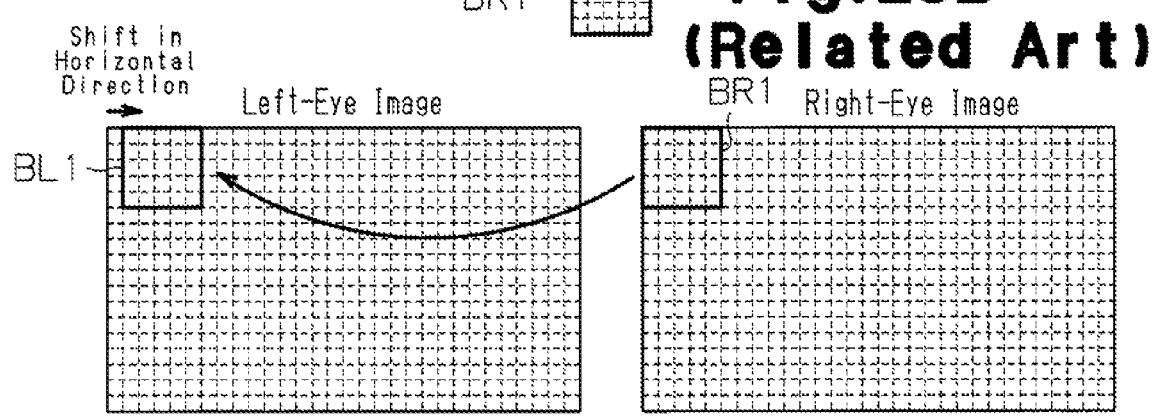
Figure 23C:
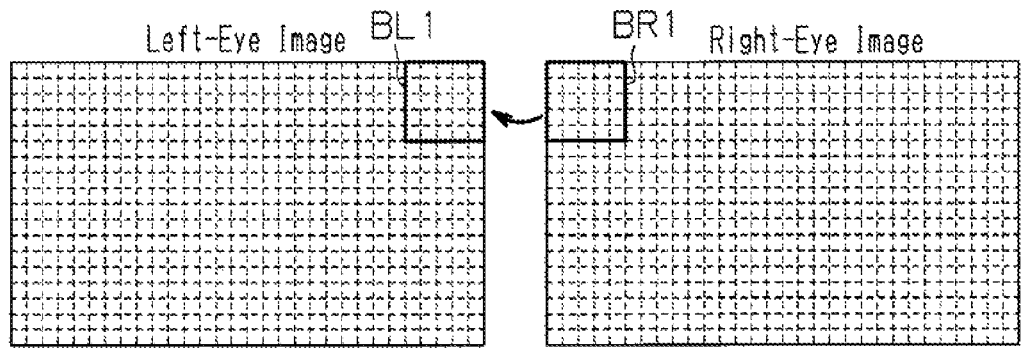
Figure 24A:
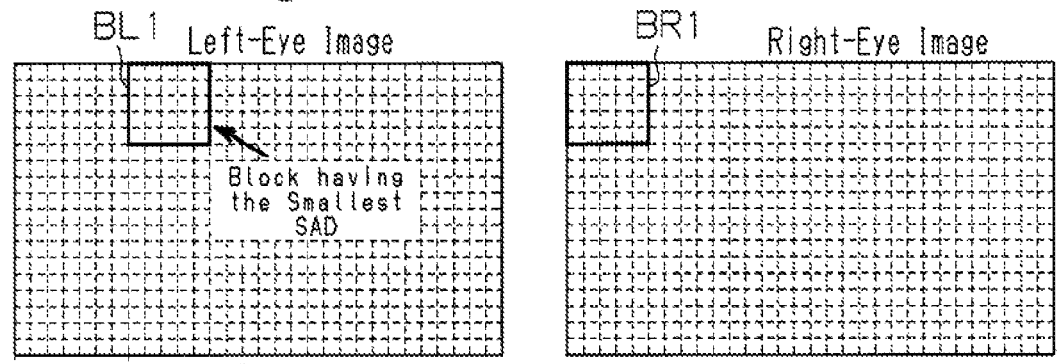
FIGS. 24A to 24C are diagrams illustrating deviation amount calculation process in the related art.
Figure 24B:
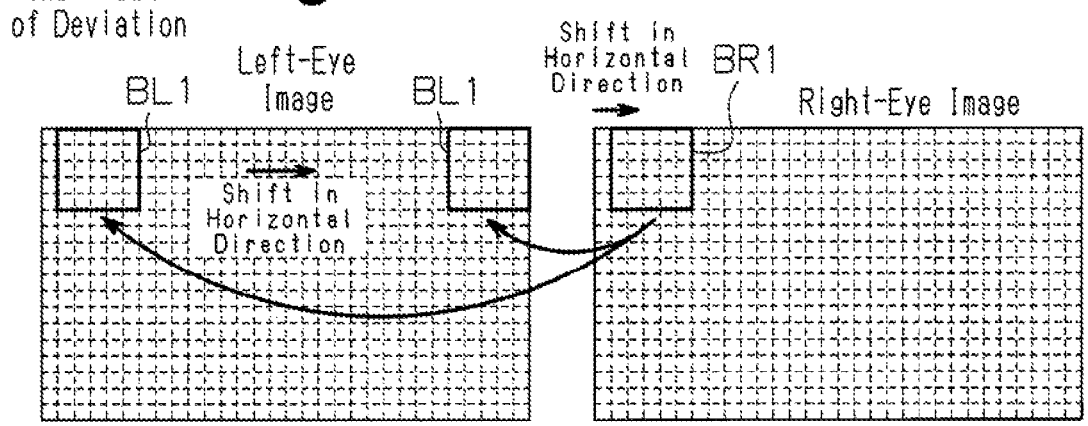
Figure 24C:
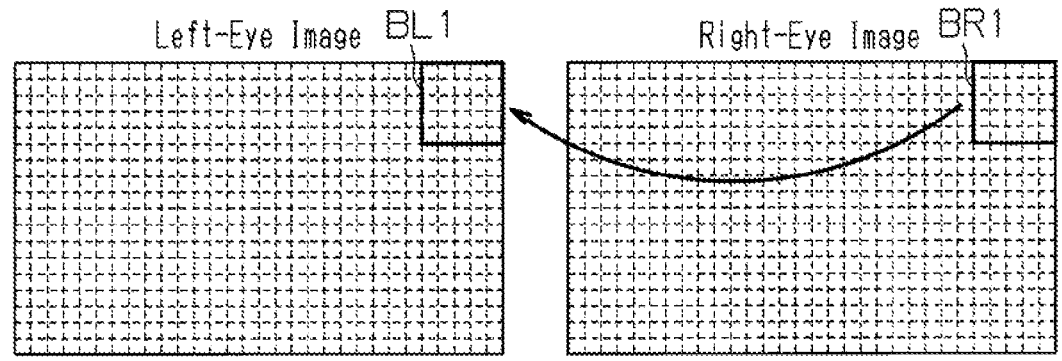
Figure 25A:
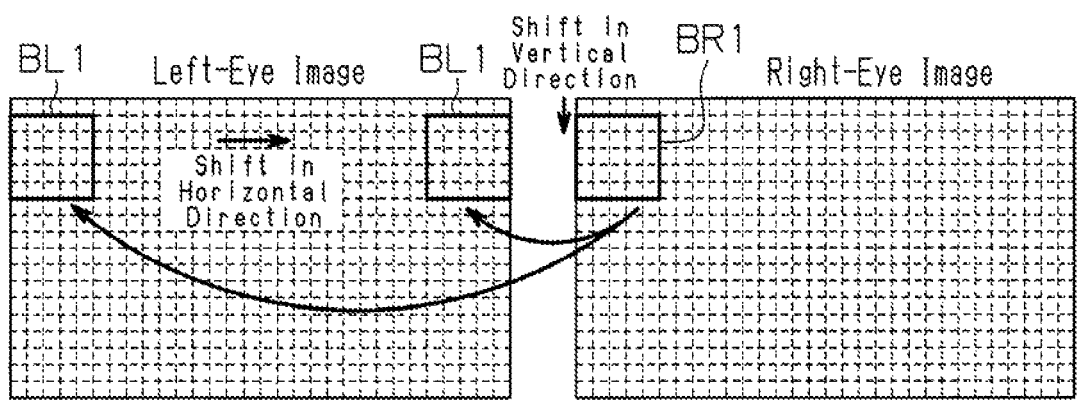
FIGS. 25A and 25B are diagrams illustrating deviation amount calculation process in the related art.
Figure 25B:
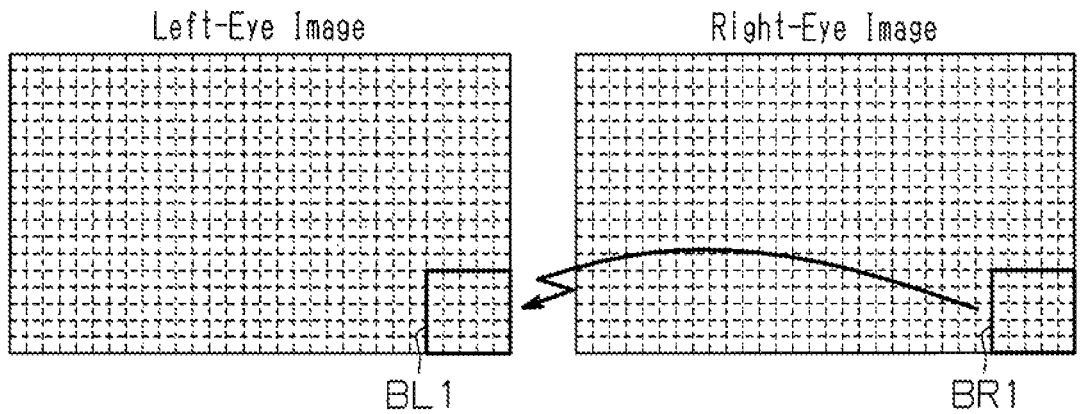

Thereafter, similarly, the cut block BR is moved horizontally and vertically to perform the deviation amount calculation process. Then, after the vertical position Vp of the upper left pixel of the cut block BR matches a value obtained by subtracting the vertical block size BVs of the cut block BR from the vertical size Vs of the right-eye image PR, as illustrated in FIG. 21C, when the deviation amount calculation process at the vertical position Vp is finished (YES in step S20), all of the deviation amount calculation process is finished.

The above-mentioned embodiment has following advantages.

(1) According to the calculation result obtained by the deviation amount calculation process of pixels in the N-th row, the moving limit ML of the compared block BL in the deviation amount calculation process of pixels in (N+1)-th row is narrowed. This reduces the number of the compared blocks BL cut from the left-eye image PL in the deviation amount calculation process in the (N+1)-th row, thereby reducing the amount of computation for calculating the amount of deviation. Accordingly, time required for the deviation amount calculation process may be shortened.

(2) With the same subject, even when the vertical position moves, the amount of deviation in the horizontal direction hardly changes. Therefore, by narrowing the moving limit ML of the compared block BL on the basis of the calculation result at the previous vertical position (N-th row), the compared block BL highly correlated with the cut block BR may be preferably searched in the narrowed moving limit ML. Accordingly, even when the moving limit ML of the compared block BL is narrowed, the amount of deviation at each cut block may be accurately and efficiently calculated.

(3) Since the number of the compared blocks BL cut from the left-eye image PL is reduced, the number of times of access to the memory 51 for reading the compared block BL may be reduced.

(4) The deviation amount calculation process of the block range determined to have no parallax (for example, the block range having the amount of deviation of 0 pixels) is skipped. This decreases the number of the cut block BR cut from the right-eye image PR and the compared block BL cut from the left-eye image PL. Thus, the amount of computation for calculating the amount of deviation becomes smaller. Accordingly, processing time required for the deviation amount calculation process may be reduced. Further, the number of times of access to the memory 51 for reading the cut block BR and the compared block BL may be reduced.

(5) In calculating the amount of deviation of pixels in the (N+1)-th row, when all values of the SAD calculated in the moving limit ML is equal to or higher than the determination level T1, the moving limit ML is set to the whole of the processing area A1 and then, the deviation amount calculation process of each pixel in the (N+1)-th row is performed again. Thereby, even when a subject that is different from the subject appearing in the N-th row appears in the N+1-th row and thus the calculation result of the N-th row may not be effectively used, the amount of deviation may be accurately calculated by resetting the moving limit ML to the whole of the processing area A1.

It should be apparent to those skilled in the art that the aforementioned embodiments may be embodied in many other forms without departing from the scope of the invention. Particularly, it should be understood that the aforementioned embodiments may be embodied in the following forms.

The size of the processing area A1 in the above embodiment is not specifically limited. For example, the horizontal block size AHs of the processing area A1 may be set equal to the horizontal size Hs of the left-eye image PL. The vertical block size of the processing area A1 may be set to be larger than the vertical block size BVs of the compared block BL.

In the above embodiment, the compared block BL is cut while being horizontally moved one by one pixel in the moving limit ML set in the processing area A1 of the left-eye image PL. However, the compared block BL may be cut while being horizontally moved every P (P is an integer of 1 or larger) pixels, for example, every two pixels in the moving limit ML set in the processing area A1.

In the above embodiment, the compared block BL is moved in the moving limit ML set in the processing area A1 in the horizontal direction. However, the compared block BL may be moved in two directions, that is, the horizontal direction (row direction) and the vertical direction (column direction), in the moving limit ML set in the processing area A1. In this case, in addition to the amount of deviation of each cut block BR in the horizontal direction, the amount of deviation of each cut block BR in the vertical direction may be calculated.

Although the block size BVs×BHs of each of the cut block BR and the compared block BL is set to 5 pixels×5 pixels in the above embodiment, the size is not specifically limited. For example, the block size BVs×BHs may be set to 3 pixels×3 pixels or 3 pixels×5 pixels.

In the above embodiment, the cut block BR is cut from the right-eye image PR, and the compared block BL is cut from the left-eye image PL. However, the cut block may be cut from the left-eye image PL, and the compared block may be cut from the right-eye image PR.

In the above embodiment, the moving limit ML of the compared block BL in the deviation amount calculation process in the next row is set based on the minimum point(s) of the SAD, which is extracted at the position of each cut block at the previous row. However, for example, the moving limit ML of the compared block BL in the deviation amount calculation process in the next row may be narrowed based on the smallest value of SAD, which is calculated at the position of each cut block at the previous row. In this case, for example, the moving limit ML may be narrowed based on the moving distance of the compared block BL (that is, the amount of deviation), which corresponds to the smallest value of SAD.

Although the SAD of the luminance signal is used as the correlation value between the cut block BR and the compared block BL in the above embodiment, the correlation value is not specifically limited to the SAD as long as it may determine similarity between the cut block BR and the compared block BL.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to an illustration of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A device for processing an image comprising:
an input unit that receives a first image and a second image that are taken from different positions, the first image and the second image each including a plurality of pixels arranged in a two-dimensional matrix;
a first cutting unit that cuts a first block of a given size from the first image at a position corresponding to a pixel in N-th row and L-th column (N and L are each an integer of 1 or larger) of the first image;
a second cutting unit that moves a second block of the given size by P (P is an integer of 1 or larger) pixels in a row direction, in a moving limit set in a processing area of the second image in accordance with the position of the first block, and cuts the second block from the second image in the moving limit;
a correlation value calculating unit that calculates a correlation value between the first block and the second block by comparing the first block with the second block each time the second block is cut;
a deviation amount calculating unit that calculates a largest value of the correlation value at each position of the first block and calculates an amount of deviation between the first image and the second image at each position of the first block based on a moving distance of the second block corresponding to the largest value of the correlation value; and
a setting unit that sets the moving limit, wherein the setting unit narrows the moving limit based on the correlation value calculated in the N-th row when the amount of deviation is calculated in the (N+1)-th row of the first image.

2. The device according to claim 1, wherein
the correlation value is a sum of absolute difference that represents a sum of absolute luminance difference between a pixel in the first block and a pixel in the second block, and
the setting unit is configured to
extract a minimum point of the sum of absolute difference at each position of the first block in the N-th row, the minimum point being lower than a given determination level,
determine a range of the moving distance of the second block corresponding to a dense area where the minimum points extracted at each position of the first block in the N-th row are dense, and
narrow the moving limit based on the range of the moving distance of the second block corresponding to the dense area.

3. The device according to claim 2, wherein
the setting unit sets the moving limit to a pixel area including X (X is an integer of 1 or larger) pixels before and after an average value of the moving distance of the second block corresponding to the minimum points in the dense area.

4. The device according to claim 3, wherein
a value of X of the X pixels is set to be smaller as variation in the moving distance of the second block corresponding to the minimum points in the dense area is smaller.

5. The device according to claim 3, wherein
when the average value in the dense area, which is determined in the (N+1)-th row, is deviated from the average value in the dense area, which is determined in the N-th row, the setting unit changes the moving limit based on the deviated average value.

6. The device according to claim 2, wherein
the moving limit is one of a plurality of moving limits set in the processing area, and
the setting unit excludes from the plurality of moving limits the moving limit in which all values of the sum of absolute difference are equal to or higher than the determination level.

7. The device according to claim 2, wherein
when all values of the sum of absolute difference calculated in the moving limit at each position of the first block in the (N+1)-th row are equal to or higher than the determination level, the setting unit sets the moving limit to the whole of the processing area and the deviation amount calculating unit recalculates the amount of deviation at each position of the first block in the (N+1)-th row.

8. The device according to claim 1, further comprising:
an extracting unit that extracts a position of the first block in the row direction at which the amount of deviation is 0 in the M-th (M is an integer of N or N+1 or larger) row of the first image; and
a first control unit that controls to skip, in the (M+1)-th row of the first image, cutting of the first block at the position of the first block in the row direction at which the amount of deviation is 0.

9. The device according to claim 1, further comprising a second control unit that controls to calculate the amount of deviation in the (M+V)-th row (V is the number of pixels in the column direction of the first block) following the M-th row when all of the amount of deviation calculated in the M-th (M is an integer of N or N+1 or larger) row of the first image is 0.

10. A method for processing an image comprising:
inputting a first image and a second image that are taken from different positions, the first image and the second image each including a plurality of pixels arranged in a two-dimensional matrix;
cutting a first block of a given size from the first image at a position corresponding to a pixel in N-th row and L-th column (N and L are each an integer of 1 or larger) of the first image;
cutting a second block of the given size from the second image in a moving limit set in a processing area of the second image in accordance with the position of the first block;
comparing the first block with the second block to calculate a correlation value between the first block and the second block;
moving the second block by P (P is an integer of 1 or larger) pixels in a row direction in the moving limit set in the processing area and calculating the correlation value each time the second block is cut;
calculating a largest value of the correlation value at each position of the first block;
calculating an amount of deviation between the first image and the second image at each position of the first block based on a moving distance of the second block corresponding to the largest value of the correlation value;
moving the first block one by one pixel in the row direction in the N-th row of the first image to cut the first block and comparing the cut first block with the second block cut in the moving limit to calculate the correlation value and the amount of deviation at each position of the first block in the N-th row; and
narrowing the moving limit based on the correlation value calculated in the N-th row when the amount of deviation is calculated in the (N+1)-th row of the first image.

11. An imaging device comprising:
an imaging unit that outputs a first image and a second image that are taken from different positions, the first image and the second image each including a plurality of pixels arranged in a two-dimensional matrix;
a first cutting unit that cuts a first block of a given size from the first image at a position corresponding to a pixel in N-th row and L-th column (N and L are each an integer of 1 or larger) of the first image;
a second cutting unit that moves a second block of the given size by P (P is an integer of 1 or larger) pixels in a row direction, in a moving limit set in a processing area of the second image in accordance with the position of the first block, and cuts the second block from the second image in the moving limit;
a correlation value calculating unit that calculates a correlation value between the first block and the second block by comparing the first block with the second block each time the second block is cut;
a deviation amount calculating unit that calculates a largest value of the correlation value at each position of the first block and calculates an amount of deviation between the first image and the second image at each position of the first block based on a moving distance of the second block corresponding to the largest value of the correlation value; and
a setting unit that sets the moving limit, wherein the setting unit narrows the moving limit based on the correlation value calculated in the N-th row when the amount of deviation is calculated in the (N+1)-th row of the first image.

* * * * *